(12) United States Patent
Hansson et al.

(10) Patent No.: US 11,932,494 B2
(45) Date of Patent: Mar. 19, 2024

(54) RAW MATERIAL DELIVERY DEVICES AND METHODS OF OPERATING THE SAME

(71) Applicant: ARCAM AB, Mölnlycke (SE)

(72) Inventors: Karl Hansson, Molnlycke (SE); Peter Karlsson, Molnlycke (SE)

(73) Assignee: Arcam AB, Mölnlycke (SE)

( * ) Notice: Subject to any disclaimer, the term of this patent is extended or adjusted under 35 U.S.C. 154(b) by 319 days.

(21) Appl. No.: 17/329,967

(22) Filed: May 25, 2021

(65) Prior Publication Data

US 2022/0380130 A1  Dec. 1, 2022

(51) Int. Cl.
| | |
|---|---|
| *B65G 27/12* | (2006.01) |
| *B22F 12/50* | (2021.01) |
| *B33Y 10/00* | (2015.01) |
| *B33Y 30/00* | (2015.01) |
| *B33Y 40/10* | (2020.01) |
| *B65G 27/02* | (2006.01) |

(52) U.S. Cl.
CPC ............. *B65G 27/12* (2013.01); *B22F 12/50* (2021.01); *B65G 27/02* (2013.01); *B33Y 10/00* (2014.12); *B33Y 30/00* (2014.12); *B33Y 40/10* (2020.01); *B65G 2201/042* (2013.01)

(58) Field of Classification Search
None
See application file for complete search history.

(56) References Cited

U.S. PATENT DOCUMENTS

| | | | | |
|---|---|---|---|---|
| 4,264,238 | A | * | 4/1981 | Leckband .......... B65G 53/4641 406/171 |
| 9,669,583 | B2 | | 6/2017 | Ferrar |
| 2018/0339466 | A1 | | 11/2018 | El Naga et al. |
| 2020/0324467 | A1 | * | 10/2020 | Tjellesen ................ B22F 12/50 |

FOREIGN PATENT DOCUMENTS

| | | |
|---|---|---|
| CN | 105618757 | 6/2016 |
| CN | 107695355 | 2/2018 |
| DE | 102015222689 | 5/2017 |
| EP | 3209446 | 8/2017 |
| GB | 2568521 | 5/2019 |
| WO | 2016131785 | 8/2016 |
| WO | 2017194387 | 11/2017 |
| WO | 2018164491 | 9/2018 |

* cited by examiner

*Primary Examiner* — Kavel Singh
(74) *Attorney, Agent, or Firm* — Dinsmore & Shohl LLP

(57) ABSTRACT

Raw material devices, systems that incorporate raw material delivery devices, and methods of supplying raw material using the raw material devices. A raw material delivery device includes a hollow body comprising a first end and a second end, the second end disposed above the first end in a system vertical direction, an inlet disposed at the first end of the hollow body, an outlet disposed at the second end of the hollow body, and a stepped passageway disposed within the hollow body between the inlet and the outlet. The stepped passageway is configured to deliver raw material via one or more steps from the inlet to the outlet.

18 Claims, 13 Drawing Sheets

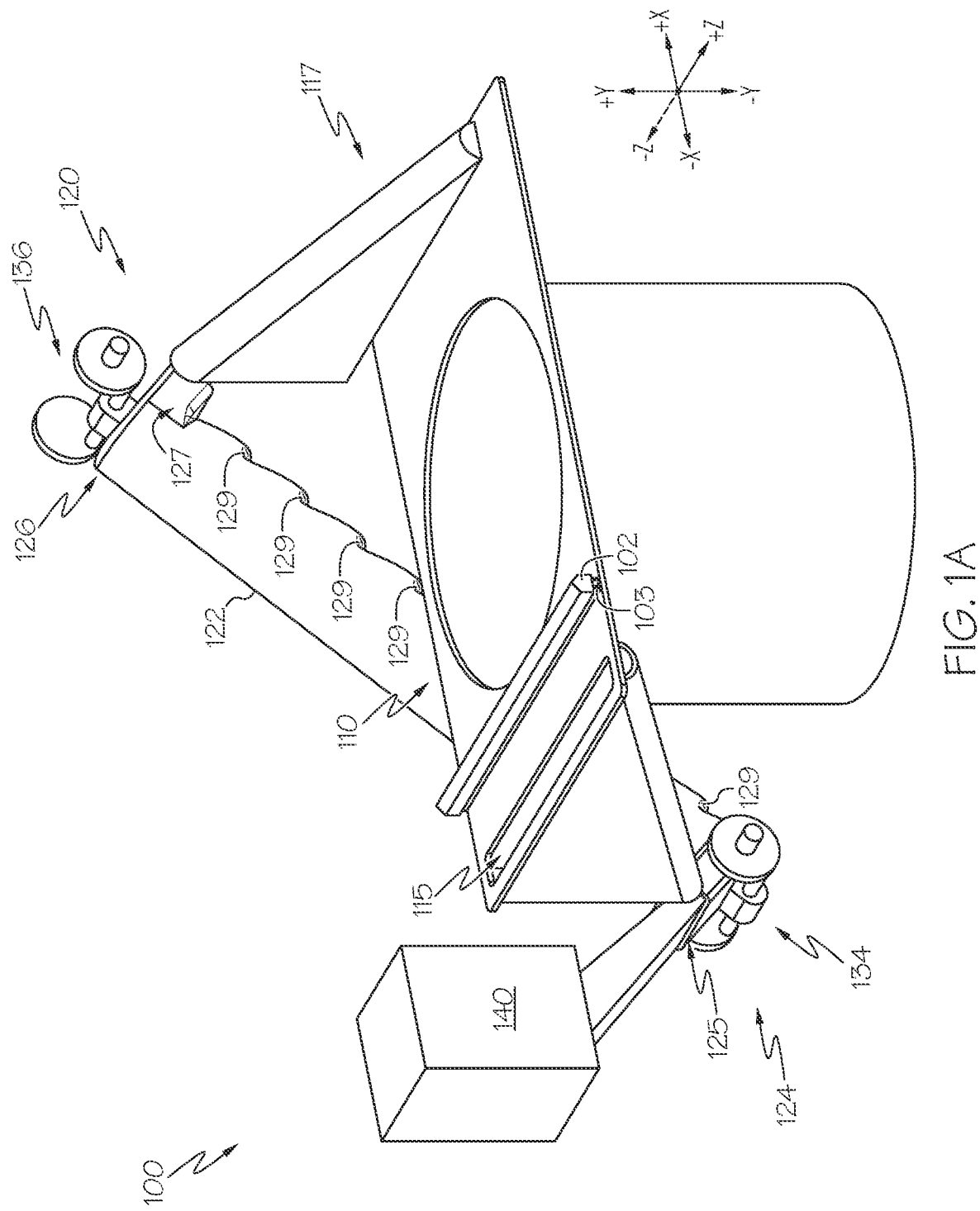

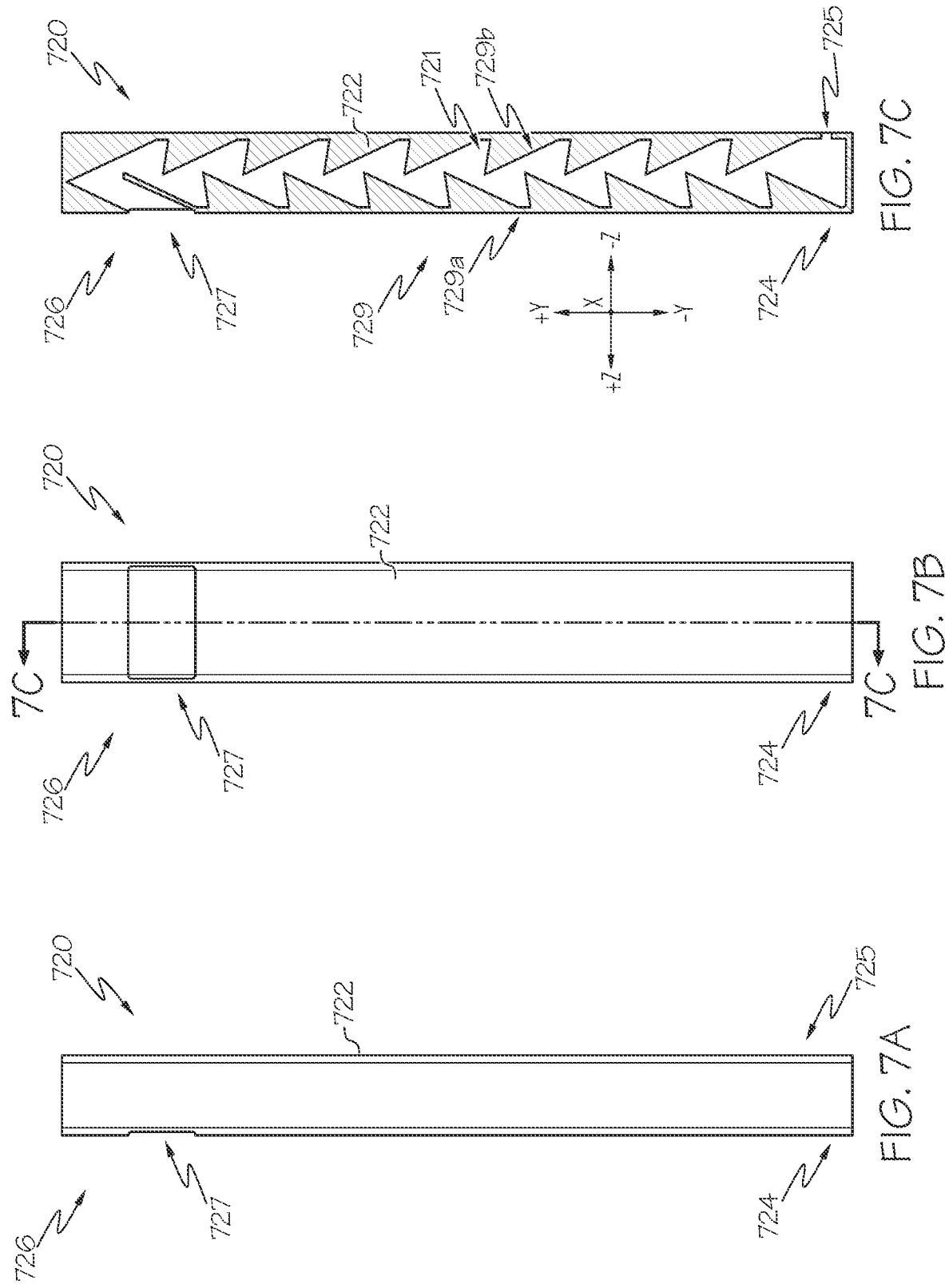

RAW MATERIAL DELIVERY DEVICES AND METHODS OF OPERATING THE SAME

FIELD

The present disclosure relates to devices, systems, and methods for moving materials, and more specifically to devices, systems and methods, for depositing portions of material on a surface at a time.

BACKGROUND

Systems and components that are typically used to provide material over a surface, such as raw build material (e.g., powder) over a build surface in an additive manufacturing system, typically allow an indiscriminate amount of material to be placed on the build surface. That is, the material is typically not measured, as the material is typically allowed to fall under force of gravity from one or more hoppers. Such a system may result in an excessive amount of material to be distributed onto the build platform and/or excessive material being disposed or subject to a recycling process. Furthermore, the material hoppers that are typically used take up an excessive amount of real estate within a build chamber and/or a build envelope, which limits the amount of space available for other components, movement of components, and/or the like.

SUMMARY

In a first aspect, a raw material delivery device includes a hollow body comprising a first end and a second end, the second end disposed above the first end in a system vertical direction, an inlet disposed at the first end of the hollow body, an outlet disposed at the second end of the hollow body, and a stepped passageway disposed within the hollow body between the inlet and the outlet. The stepped passageway is configured to deliver raw material via one or more steps from the inlet to the outlet.

In a second aspect, an additive manufacturing system includes a work surface and a raw material delivery device disposed adjacent to the work surface. The raw material delivery device includes a hollow body comprising a first end and a second end, the second end disposed above the first end in a system vertical direction, an inlet disposed at the first end of the hollow body, an outlet disposed at the second end of the hollow body, and a stepped passageway disposed within the hollow body between the inlet and the outlet. The stepped passageway is configured to deliver raw material via one or more steps from the inlet to the outlet.

In a third aspect, a method of supplying raw material to a work surface of an additive manufacturing system includes supplying the raw material to an inlet of a raw material delivery device, where the inlet is disposed at a first end of a hollow body. The method further includes actuating one or more actuators of the raw material delivery device such that the raw material supplied to the inlet moves up a stepped passageway disposed within the hollow body from the inlet to an outlet disposed at a second end of the hollow body that is located above the first end of the hollow body in a system vertical direction.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 1A depicts a side perspective view of an illustrative raw material delivery device disposed adjacent to a work surface in an additive manufacturing system according to one or more embodiments shown and described herein;

FIG. 7A depicts a side view of another illustrative raw material delivery device having a staggered step configuration according to one or more embodiments shown and described herein;

FIG. 7B depicts a front view of the raw material delivery device of FIG. 7A;

FIG. 7C depicts a cutaway side view of the raw material delivery device of FIG. 7A;

DETAILED DESCRIPTION

The present disclosure generally relates to various raw material delivery devices and methods of moving raw materials in an additive manufacturing system or similar system. The raw material delivery devices described herein are generally sufficiently compact such that components thereof can be fit within typical build chambers of additive manufacturing systems without further modification of the build chamber, which also allows for retrofitting of existing build chambers. The raw material delivery devices described herein include a stepped passageway that delivers the raw material from a first location to a second location, with the second location generally being at or near the work surface such that the raw material can be disposed on the work surface for the build process. The first location may be an area located elsewhere, such as near a powder hopper or other supply source that supplies powder and/or a powder recovery chute that collects excess powder that has been removed from the work surface. The stepped passageway is at least partially disposed within a hollow body of the raw material delivery device, and the raw material delivery device is configured in one of a plurality of different ways to move to cause a portion of raw material to move from each step to the next from the first location to the second location, thereby ensuring only the portion of the raw material is deposited on the work surface at a time. As a result, less material is used on the work surface at a time such that less excess or waste material (e.g., unused material) is produced, resulting in a more efficient use of material in additive manufacturing processes and ensuring less material is scattered throughout a build chamber during a build process, which may result in more accurate building of an article relative to traditional additive manufacturing systems.

While the present disclosure generally relates to the use of the raw material delivery devices in an additive manufacturing system, the present disclosure is not limited to such. The raw material delivery devices may also be used for other purposes and as a portion of other systems without departing from the present disclosure. For example, the raw material delivery devices described herein may be used with other types of manufacturing systems that require material delivery, agricultural equipment (e.g., to move soil, seeds, or the like), with construction equipment (e.g., to move concrete, asphalt, or the like), other manufacturing equipment (e.g., equipment that does not include additive manufacturing), with healthcare equipment, with pharmaceutical manufacturing equipment, or the like. Other uses of the raw material delivery devices should be apparent from the present disclosure.

Figure 1B:
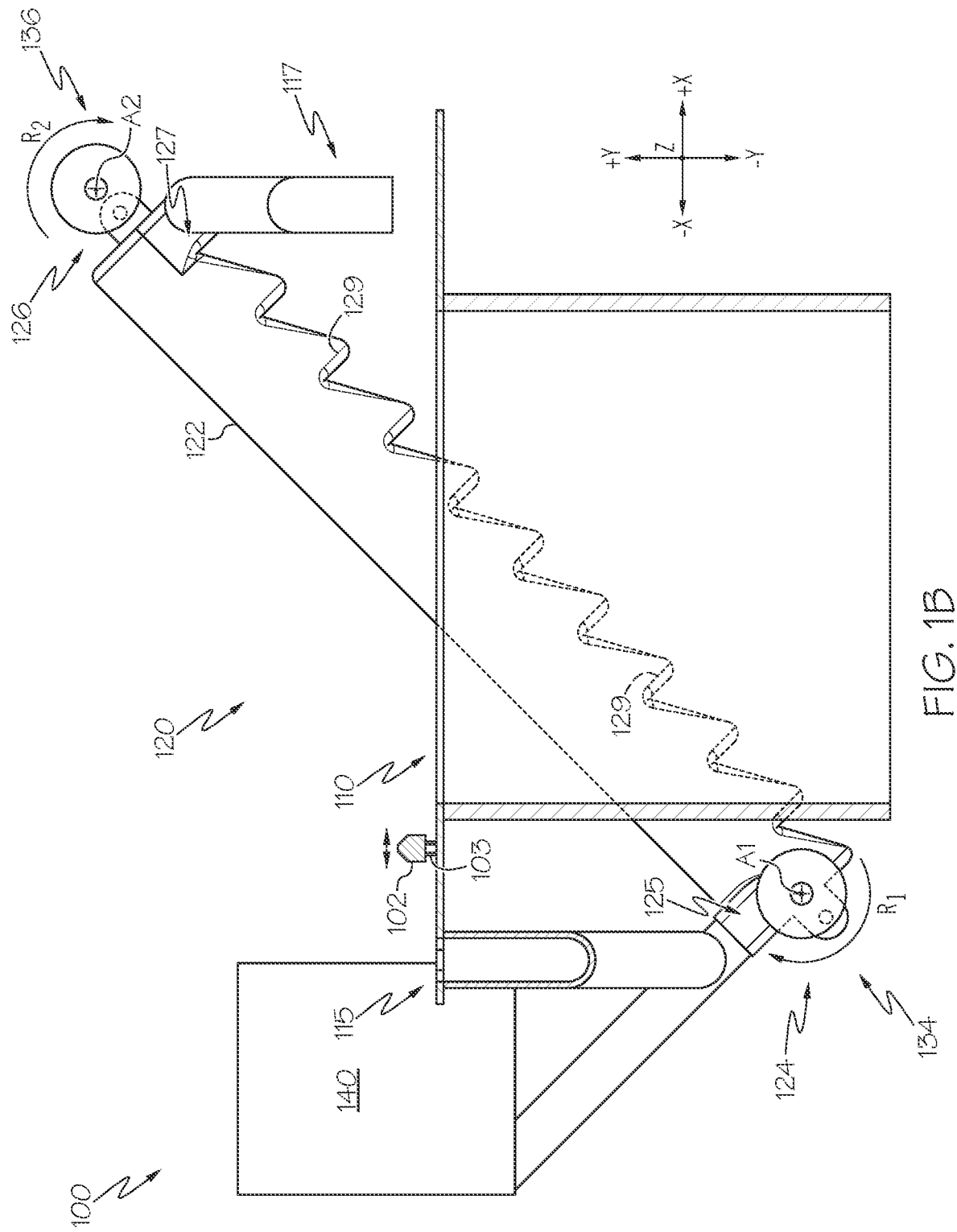
FIG. 1B depicts a side view of the raw material delivery device adjacent to the work surface of FIG. 1A.
Figure 8A:
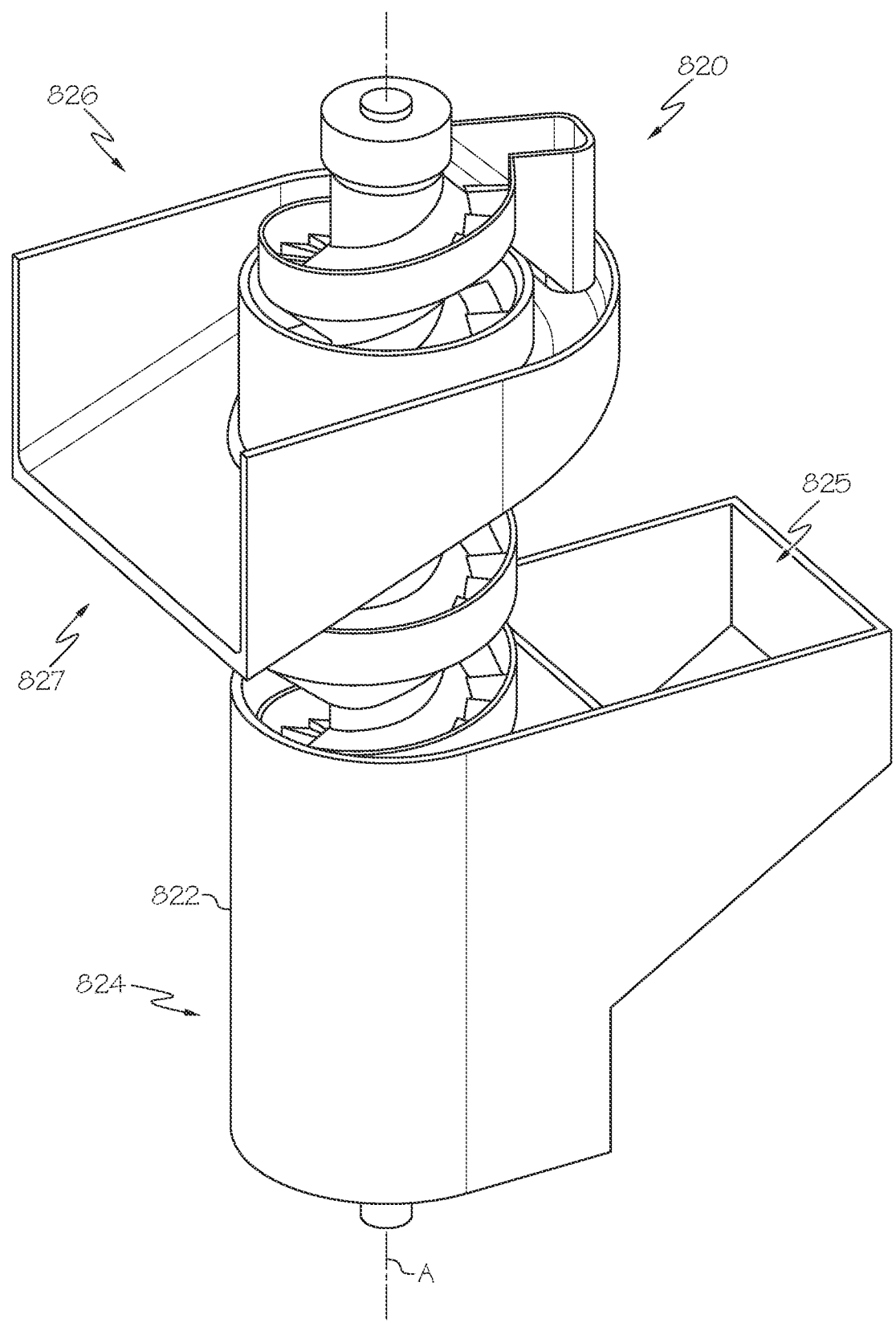
FIG. 8A depicts a side perspective view of another illustrative raw material delivery device having a plurality of steps arranged in a spiral configuration according to one or more embodiments shown and described herein.
Figure 8B:
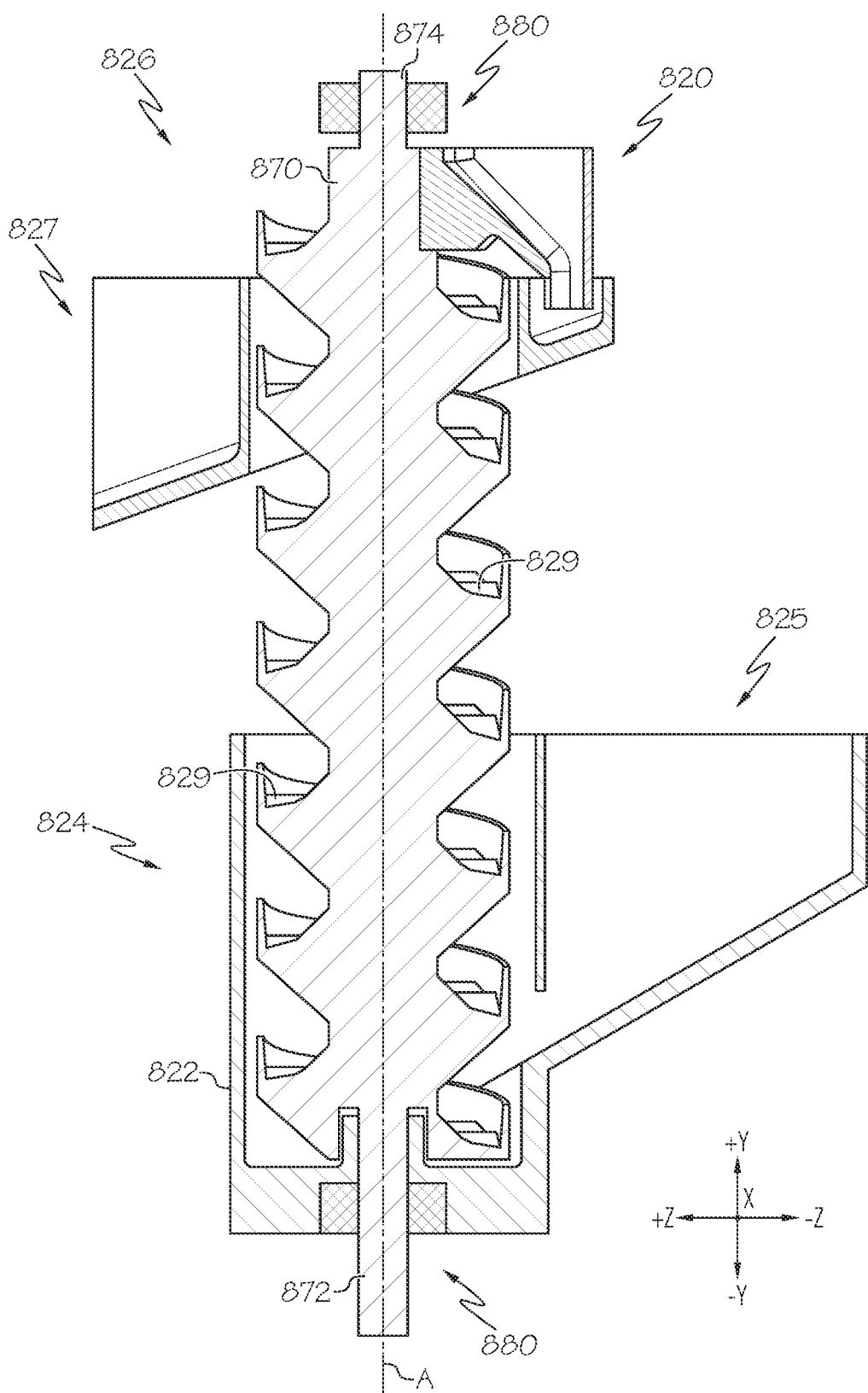
FIG. 8B depicts a cutaway side view of the raw material delivery device of FIG. 8A, illustrating that rotational movement from a rotary actuator moves the raw material according to one or more embodiments shown and described herein.
Figure 9:
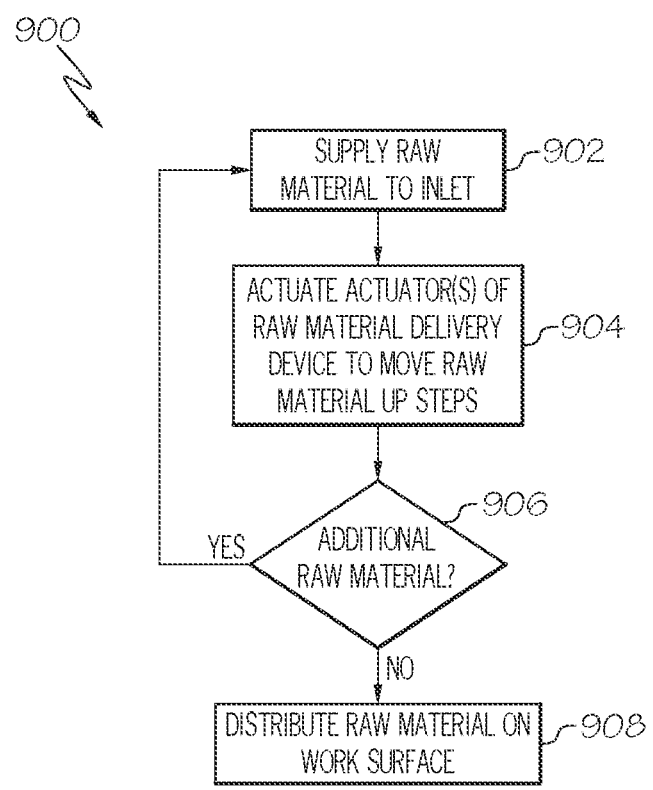
FIG. 9 depicts a flow diagram of an illustrative method of moving raw material through a raw material delivery device according to one or more embodiments shown and described herein.

One such particularly configured additive manufacturing system that includes a raw material delivery device is depicted in FIGS. 1A and 1B, whereby the raw material delivery device is depicted as a hollow body having an inlet disposed below a work surface and an outlet disposed above a work surface, as described in greater detail herein. Various details regarding the features, components, and functionality of the raw material delivery device for FIGS. 1A-1B are shown and described with respect to FIGS. 2 and 3A-3F. Other illustrative examples of raw material delivery devices that may be used are shown and described with respect to FIGS. 4, 5A-5C, 6A-6C, 7A-7C, and 8A-8B. FIG. 9 depicts a flow diagram of an illustrative method of operating the various raw material delivery devices described herein.

Electron-beam additive manufacturing, which may also be known as electron-beam melting (EBM), is a type of additive manufacturing (e.g., 3D printing) process that is typically used for metallic articles. EBM utilizes a raw material in the form of a metal powder or a metal wire, which is placed under a vacuum (e.g., within a vacuum sealed build chamber). Generally speaking, the raw material is fused together from heating via an electron beam.

The systems described herein that utilize EBM generally obtain data from a 3D computer-aided design (CAD) model and use the data to place successive layers of the raw material using an apparatus to spread the raw material, such as a powder distributor. The successive layers are melted together utilizing a plurality of electronically-controlled electron beams. As noted above, the process takes place under vacuum within a vacuum sealed build chamber, which makes the process suited to manufacture parts using reactive materials having a high affinity for oxygen (e.g., titanium). In embodiments, the process operates at higher temperatures (up to about 1000° C.) relative to other additive manufacturing processes, which can lead to differences in phase formation through solidification and solid-state phase transformation.

FIGS. 1A and 1B depict an embodiment of the present disclosure, showing a portion of an illustrative additive manufacturing system 100 including a work surface 110 (e.g., a build platform or the like) and a raw material delivery device 120 disposed adjacent to the work surface 110. More specifically, FIG. 1A depicts a perspective view of the portion of the additive manufacturing system 100 and FIG. 1B depicts a side view of the portion of the additive manufacturing system 100. As depicted in FIGS. 1A and 1B, the raw material delivery device 120 is positioned adjacent to the work surface 110 such that material passed through the raw material delivery device 120 can be deposited on the work surface 110. While FIGS. 1A and 1B show the raw material delivery device 120 as being disposed next to the work surface 110, other positions are contemplated and included within the scope of the present disclosure. That is, the positioning depicted in FIGS. 1A and 1B is not limited by the present disclosure. For example, the raw material delivery device 120 may be disposed above the work surface 110 (e.g., further in the +y direction of the coordinate axes of FIGS. 1A-1B), may extend through an opening in the work surface 110, may be integrated with or coupled to the work surface 110, and/or the like. In some embodiments, the raw material delivery device 120 may be disposed outside a vacuum chamber of the additive manufacturing system 100, but an interior of the raw material delivery device may be vacuum sealed and fluidly coupled to components inside the vacuum chamber of the additive manufacturing system 100.

In addition to the work surface 110 and the raw material delivery device 120, the additive manufacturing system 100 may also include a supply assembly 117 coupled between the raw material delivery device 120 and the work surface 110 in some embodiments. In some embodiments, the additive manufacturing system 100 may also include a recovery chute 115 coupled to the work surface 110. In some embodiments, the additive manufacturing system 100 may also include one or more raw material hoppers 140. It should be appreciated that the additive manufacturing system 100 may include additional components that are not depicted in FIGS. 1A and 1B, such as, for example, an electron beam (EB) gun, an imaging device, a sensing device, build platform movement components, and/or one or more control or analysis components. Such devices and components should generally be understood and are not described in greater detail herein.

Referring to both FIGS. 1A and 1B, the work surface 110 and the raw material delivery device 120 may be located in or near a build tank or build chamber of the additive manufacturing system 100. While not depicted in FIGS. 1A and 1B, the build tank is generally disposed within a vacuum environment of the build chamber. That is, the build tank is located within the build chamber such that one or more chamber walls of the build chamber define an interior in which the build tank is disposed. The interior containing the build tank is separated from an exterior environment via the one or more chamber walls. In some embodiments, the interior of the build chamber may be a vacuum sealed interior. However, it should be understood that in some embodiments, the build tank and the build chamber may be used interchangeably (e.g., a single space that contains the various components described herein). The vacuum environment established within the build chamber may be such that an article formed within the build tank is formed under optimal conditions for EBM, as is generally understood. The build chamber is capable of maintaining a vacuum environment via a vacuum system. Illustrative vacuum systems may include, but are not limited to, a turbo molecular pump, a scroll pump, an ion pump, and one or more valves, as are generally understood. In some embodiments, the vacuum system may be communicatively coupled to one or more control components described hereinbelow such that the one or more control components direct operation of the vacuum system to maintain the vacuum within the interior of the build chamber. In some embodiments, the vacuum system may maintain a base pressure of about $1 \times 10^{-5}$ mbar or less throughout an entire build cycle. In further embodiments, the vacuum system may provide a partial pressure of He to about $2 \times 10^{-3}$ mbar during a melting process. In other embodiments, the build tank may be provided in an enclosable chamber provided with ambient air and atmosphere pressure. In yet other embodiments, the build tank may be provided in open air.

The build tank generally includes a build envelope including the work surface 110 supporting a powder layer thereon (not shown), as well as a powder distributor 102 (e.g., a rake or the like) that is movable across a surface of the work surface 110. The build tank may further include other components, particularly components that facilitate EBM, including components not specifically described herein.

The build envelope is generally an area within the interior of the build chamber that includes a platform or receptacle that is arranged to receive the raw material from the one or more raw material hoppers 140 via the raw material delivery device 120 and/or support a workpiece thereon. The build envelope is not limited in size or configuration by the present disclosure, but may generally be shaped and sized to hold an amount of the raw material in the form of a powder layer, one or more portions of a formed article, and/or unfused raw material.

Still referring to FIGS. 1A-1B, in some embodiments, the work surface 110 may be a movable build platform supported by a lifting component (not depicted). The movable work surface 110 may generally be a surface within the build envelope that is movable by the lifting component in a system vertical direction (e.g., in the +y/-y directions of the coordinate axes of FIGS. 1A-1B) to increase and/or decrease a total volume of the build envelope. For example, the movable work surface 110 may be movable by the lifting component in a downward direction (e.g., toward the -y direction of the coordinate axes of FIGS. 1A-1B) so as to increase the volume of the build envelope. The movable work surface 110 may be movable (e.g., capable of being lowered) by the lifting component to add each successive powder layer to the article being formed. Illustrative lifting components for lifting the work surface 110 include, but are not limited to, a linear actuator type mechanism, a scissor lift, a mechanical linear actuator such as a screw based actuator, a wheel and axle actuator (e.g., a rack and pinion type actuator), a hydraulic actuator, a pneumatic actuator, a piezoelectric actuator, an electromechanical actuator, and/or the like.

Figure 2:
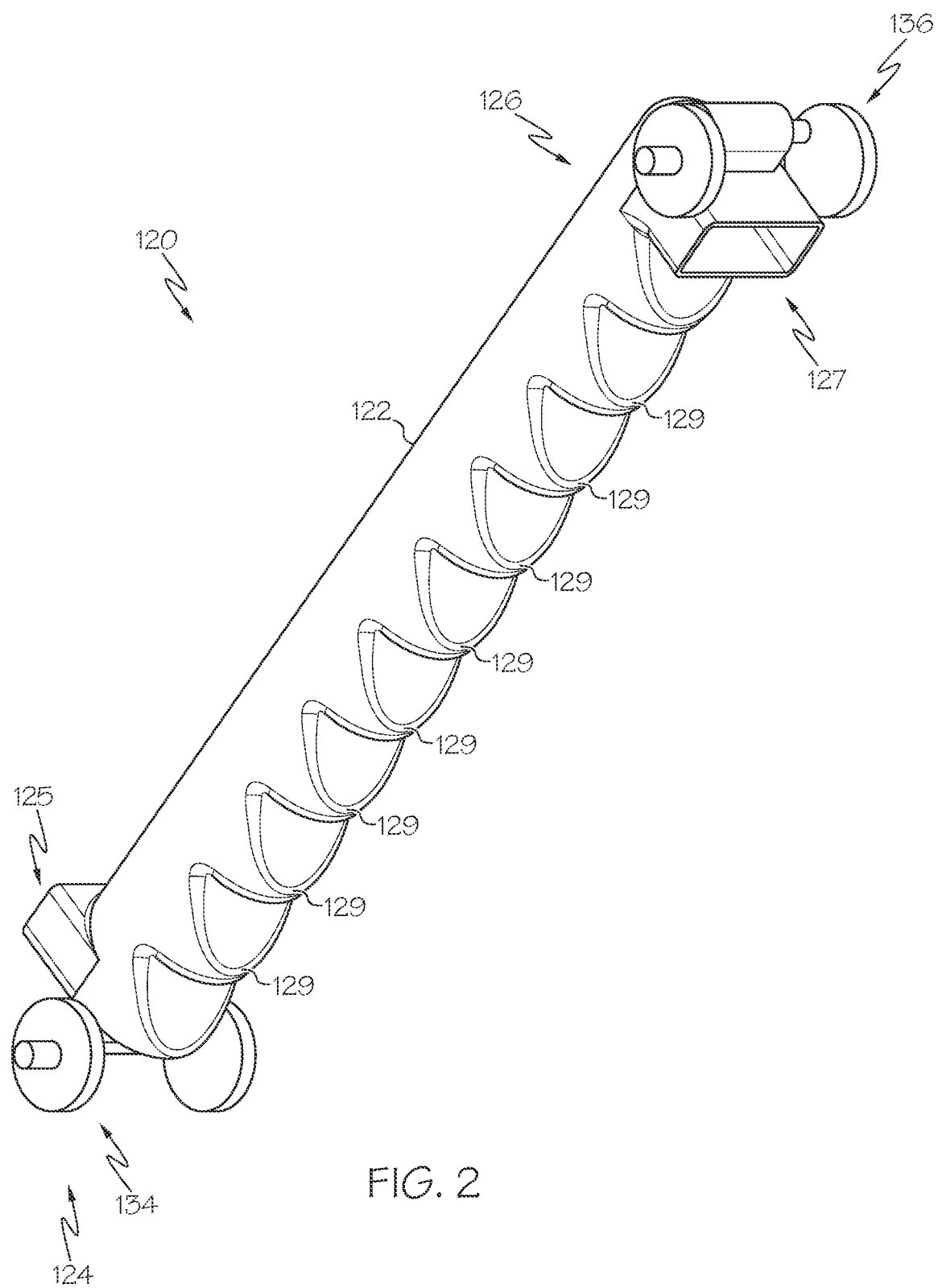
FIG. 2 depicts a perspective view of one illustrative raw material delivery device according to one or more embodiments shown and described herein.

Referring to FIGS. 1A-1B and 2, the raw material delivery device 120 is generally a component that includes a hollow body 122 having a first end 124 and a second end 126 spaced a distance from the first end 124. The raw material delivery device 120 is generally disposed within the additive manufacturing system 100 such that the second end 126 is disposed above the first end 124 in a system vertical direction. That is, the second end 126 is located above the first end 124 in the +y direction of the coordinate axes of FIGS. 1A-1B. In some embodiments, such as the embodiments depicted in FIGS. 1A-1B, 2, and 4, the second end 126 (in the embodiment of FIGS. 1A-1B as an example) is disposed at an angle relative to the system vertical direction such that the raw material delivery device 120 is not vertically disposed. The angle is not limited by the present disclosure and may be any angle such that the second end 126 is disposed within the first quadrant defined by the +y and +x axes of the coordinate axes of FIGS. 1A-1B and the first end 124 is disposed within the third quadrant defined by the -y and -x axes of the coordinate axes of FIGS. 1A-1B, or alternatively such that the second end 126 is disposed within the fourth quadrant defined by the +y and -x axes of the coordinate axes of FIGS. 1A-1B and the first end 124 is disposed within the second quadrant defined by the -y and +x axes of the coordinate axes of FIGS. 1A-1B. In other embodiments, such as the embodiments depicted in FIGS. 5A-5C, 6A-6C, 7A-7C, and 8A-8B, the raw material delivery device 520 (in the embodiment of FIGS. 5A-5C as an example) is disposed in a vertical configuration that is substantially parallel to the system vertical direction. That is, the raw material delivery device 520 generally extends along the +y/−y axis of FIG. 5C so the second end 526 and the first end 524 thereof are substantially aligned with the +y/−y axis. Referring again to FIGS. 1A-1B and 2, in some embodiments, the raw material delivery device 120 may extend at an angle relative to a plane defined by the work surface 110. For example, the angle of the raw material delivery device 120 with respect to a normal to the work surface may be any value, and in some embodiments may be between about −89° and about 89°, including (but not limited to) about −60°, about −45°, about −30°, about 0°, about 30°, about 45°, about 60°, or the like. In addition, as depicted in FIGS. 1A-1B, the first end 124 and the second end 126 may also be arranged with respect to the work surface 110 such that the first end 124 is located at a position that is generally underneath the work surface 110 (e.g., lower in the −y direction than the work surface 110) and the second end 126 is located at a position that is generally above the work surface 110 (e.g., higher in the +y direction than the work surface 110). Such an arrangement allows the first end 124 (as well as the various other components coupled to the first end 124, as described herein) to be shielded from the harsh conditions that are generally present on or above the work surface 110 (e.g., within a build chamber) during a manufacturing process so that movement of material into the interior of the hollow body 122 of the raw material delivery device 120 can be completed without hindrance or contamination. Such an arrangement further allows the second end 126 to be located with respect to the work surface 110 such that material exiting the hollow body 122 of the raw material delivery device 120 is allowed to fall under force of gravity onto the work surface 110.

Still referring to FIGS. 1A-1B and 2, the hollow body 122 of the raw material delivery device 120 is generally a body having a bore therethrough such that material can pass from one end to another end through the interior of the hollow body 122, as described in greater detail herein. In addition, the raw material delivery device 120 further includes an inlet 125 disposed at the first end 124 of the hollow body 122 and an outlet 127 disposed at the second end 126 of the hollow body 122. The inlet 125 and the outlet 127 are generally openings in the hollow body that allow for the ingress and egress of material, such as the raw material discussed herein. That is, material may enter the hollow body 122 via the inlet 125 and may exit the hollow body 122 via the outlet 127 in some embodiments. The shape and size of the inlet 125 and the shape and size of the outlet 127 are not limited by the present disclosure, and may generally be any size, particularly sizes that allow for movement of a particular amount of material therethrough, as described herein. The inlet 125 is generally shaped and sized so that it is coupled to a raw material supply source that supplies the raw material to the inlet, as described herein. For example, in some embodiments, the inlet 125 may be shaped and/or sized to correspond to a shape and/or size of an opening in the one or more raw material hoppers 140 and/or the recovery chute 115 such that the inlet 125 is couplable to the one or more raw material hoppers 140 and/or the recovery chute 115 to allow passage of material from the one or more raw material hoppers 140 to the interior of the hollow body 122 and/or the recovery chute 115, as described in greater detail herein. In some embodiments, the inlet 125 may be funnel shaped such that the opening of the inlet 125 is larger than an opening in the raw material hopper 140 to ensure collection of material exiting the raw material hopper 140 and/or material received via the recovery chute 115, as described in greater detail herein. In some embodiments, the outlet 127 may be shaped and/or sized to correspond to a shape and/or size of an opening in the supply assembly 117 such that material exiting the hollow body 122 via the outlet 127 is received within the supply assembly 117 and delivered to the work surface 110. In some embodiments, the inlet 125 and/or the outlet 127 may include a screen or other sieve like covering that only allows particles of a particular size to pass through. In some embodiments, the inlet 125 and/or the outlet 127 may include a door or the like that can be selectively closed and opened (e.g., via an actuator or the like) so as to selectively control movement of material through the inlet 125 and/or the outlet 127.

The raw material delivery device 120 also includes a stepped passageway disposed within the hollow body 122 between the inlet 125 and the outlet 127. That is, the interior of the hollow body 122 includes one or more steps 129 that are particularly shaped, sized, and positioned to receive a portion of raw material thereon. Illustrative examples of shapes, sizes, and positions of the steps 129 will be described herein with respect to FIGS. 4, 5A-5C, 6A-6C, 7A-7C, and 8A-8B. Still referring to FIGS. 1A-1B and 2, the steps 129 are further shaped, sized, and positioned such that movement of the raw material delivery device 120 as described herein allows for movement of raw material from the inlet 125 to the outlet 127 via the one or more steps 129. Illustrative example of movement of the raw material within the hollow body 122 via the one or more steps 129 will be described herein with respect to FIGS. 3A-3F.

Referring to FIG. 1B, the raw material delivery device 120 further includes a first rotary actuator 134 coupled to the first end 124 of the hollow body 122 and a second rotary actuator 136 coupled to the second end 126 of the hollow body 122. The rotary actuators 134, 136 are generally any type of actuator that can cause rotational movement, and are not limited by the present disclosure. Illustrative examples components that can be used to cause rotational movement include, but are not limited to, stepper motors, servomotors, fluid power actuators (e.g., hydraulic or pneumatic actuator), vacuum actuators, and/or the like. In another example, a linear actuator coupled to a rotating disc may be used to cause a rotational movement. In another example, linear movement of a threaded screw may cause rotational movement of a nut that is threadedly engaged with the threaded screw, and the rotational movement of the nut is translated to a rotational movement on the raw material delivery device 120. Other examples not specifically recited herein are contemplated and are included within the scope of the present disclosure.

In embodiments, the rotary actuators 134, 136 cause the respective ends 124, 126 of the hollow body 122 to rotate in a clockwise or counter-clockwise manner. That is, the first rotary actuator 134 causes the first end 124 to rotate in a first rotational direction Ri about a first axis of rotation A1 and the second rotary actuator 136 causes the second end 126 to rotate in a second rotational direction R2 about a second axis of rotation A2. The locations of the first axis of rotation A1 and the second axis of rotation A2 are generally not limited by this disclosure and may be any location, but are not in the same location as each other. For example, in the embodiment depicted in FIG. 1B, the first axis of rotation A1 is located at the first end 124 of the hollow body 122 and the second axis of rotation A2 is located at the second end 126 of the hollow body 122. Movement of the first rotary actuator 134 and the second rotary actuator 136 is controlled such that the rotary actuators 134, 136 move synchronously.

That is, the rotary actuators 134, 136 move in a manner such that the rotational movement of the first end 124 about the first axis of rotation A1 is synchronized with the rotational movement of the second end 126 about the second axis of rotation A2, as such a synchronized movement would result in an instance where the entire length of the hollow body 122 moves in a coordinated manner to throw or otherwise move raw material therethrough. Accordingly, the synchronous movement of the first end 124 and the second end 126 allow for the first end 124 and the second end 126 to move independently of one another in a manner that allows portions of raw material within the hollow body 122 to be thrown upwards (e.g., in the +y direction of the coordinate axes of FIG. 1B) from one step 129 to the next, as depicted in FIGS. 3A-3F. Further, the speed and acceleration of the first end 124 and the second end 126 may be adjusted to ensure a particular amount of raw material is moved each time a revolution is made around the axes of rotation A1, A2.

Figure 3A:
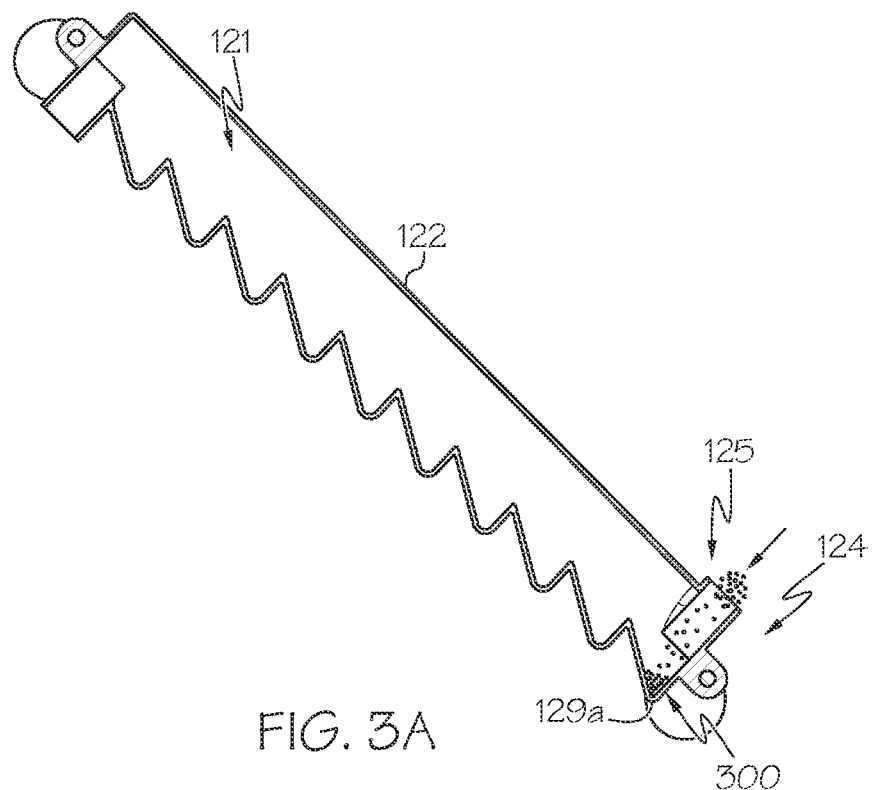
FIG. 3A depicts a cutaway side view of an illustrative raw material delivery device receiving raw material via an inlet according to one or more embodiments shown and described herein.

Referring to FIG. 3A, raw material 300 (e.g., powder or the like) flows into an interior 121 of the hollow body 122 via the inlet 125 at the first end 124 of the hollow body 122, as indicated by the arrow in FIG. 3A. For example, raw material 300 from one or more sources described herein may fall under force of gravity or the like to settle on a first step 129a in the interior 121 of the hollow body 122.

Figure 3B:
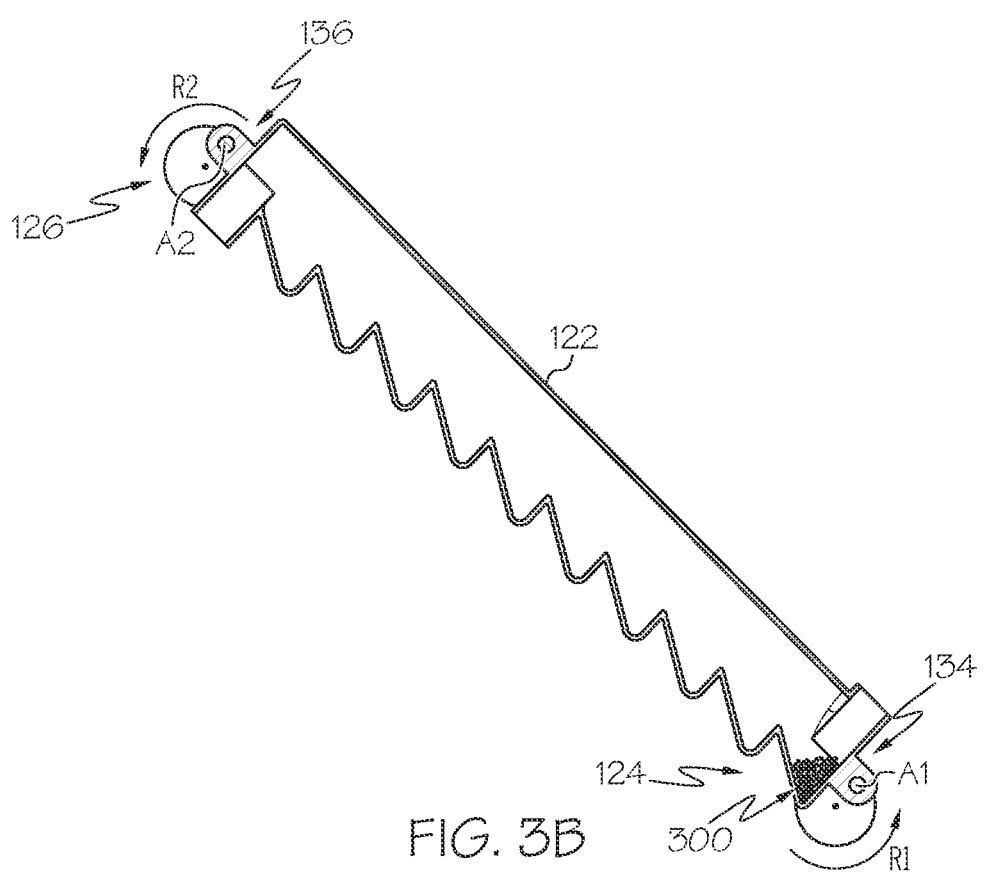
FIG. 3B depicts a cutaway side view of the raw material delivery device of FIG. 3A, indicating a rotational movement of a first rotary actuator and a second rotary actuator according to one or more embodiments shown and described herein.
Figure 3C:
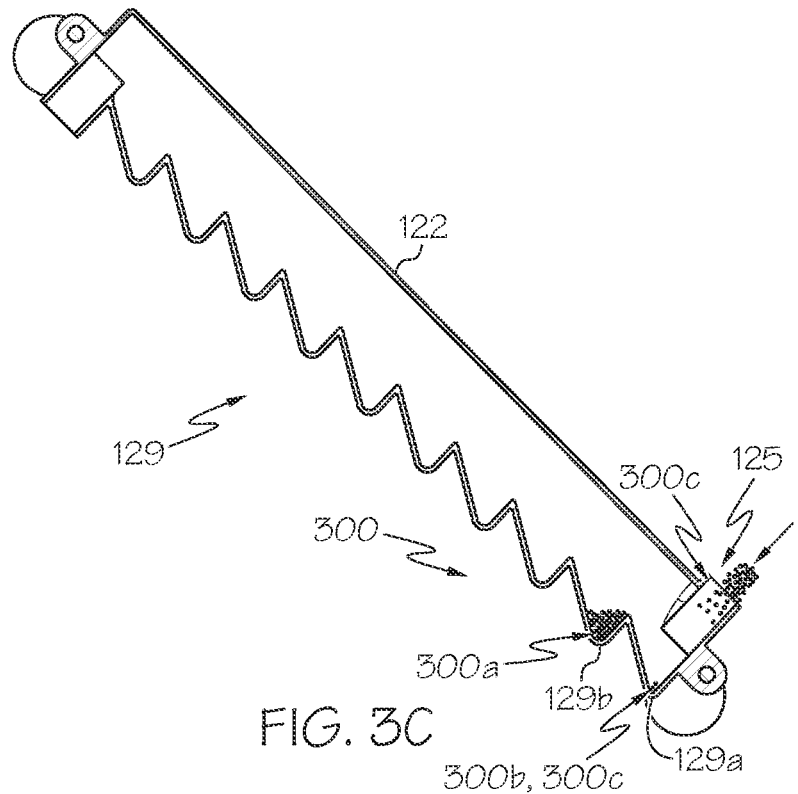
FIG. 3C depicts a cutaway side view of the raw material delivery device of FIG. 3A, indicating movement of the raw material up a first step due to the movement depicted in FIG. 3B and receiving additional raw material via the inlet according to one or more embodiments shown and described herein.

As depicted in FIG. 3B, hollow body 122 is moved to bump or throw the raw material 300. More specifically, the first rotary actuator 134 rotates the first end 124 in a first rotational direction $R_1$ about the first axis of rotation A1 and the second rotary actuator 136 rotates the second end 126 in a second rotational direction $R_2$ about the second axis of rotation A2. As previously described herein, rotation of the first rotary actuator 134 and the second rotary actuator 136 may occur in a synchronized manner with respect to one another to cause at least a portion of the raw material 300 to be bumped or thrown within the hollow body 122, as depicted in FIG. 3C. More specifically, as shown in FIG. 3C, a first portion 300a of the raw material 300 is bumped or thrown from the first step 129a to the second step 129b. In some embodiments, not all of the raw material 300 ends up on the second step 129b. That is, a second portion 300b may remain on the first step 129a. It should be appreciated that this may be because some of the raw material 300 is not bumped or thrown far enough to move from the first step 129a to the second step 129b, some of the material may fall off the second step 129b under force of gravity (or other force) back onto the first step 129a, and/or the like.

Figure 3D:
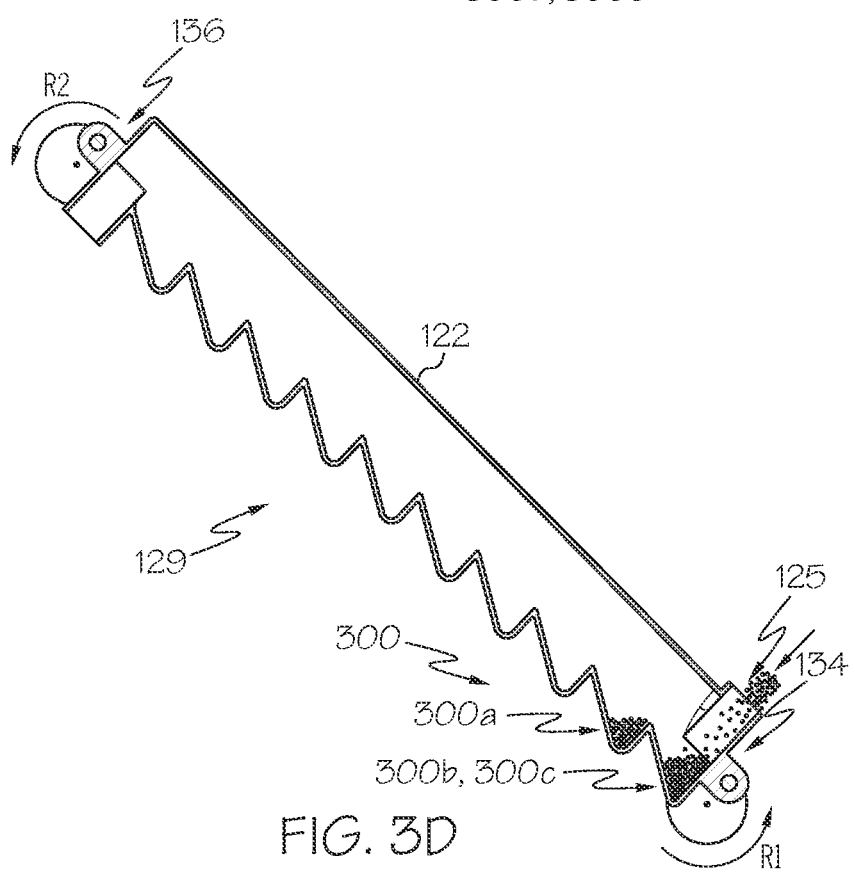
FIG. 3D depicts a cutaway side view of the raw material delivery device of FIG. 3A, indicating additional rotational movement of the first rotary actuator and the second rotary actuator according to one or more embodiments shown and described herein.

As shown in FIG. 3C and 3D, a third portion 300c of the raw material 300 is received via the inlet 125 such that it falls into the hollow body 122 (as indicated by the arrow in FIGS. 3C) onto the first step 129a along with the second portion 300b of the raw material 300 that was not bumped or thrown onto the second step 129b. In some embodiments, the raw material 300 may be continuously fed through the inlet 125 (as indicated by the arrow pointing towards the inlet 125 in FIG. 3D) into the hollow body 122 such that the raw material 300 is generally flowing into the hollow body 122 via the inlet 125 even as the synchronous movement is occurring. In other embodiments, the raw material 300 is only allow to flow into the hollow body 122 via the inlet 125 at particular intervals, such as when an actuator or the like (not shown) opens and closes the inlet 125 (or opens and closes access to the inlet 125). In such embodiments, control of the flow of raw material 300 via the inlet 125 may be operated in tandem with the synchronous movement such that flow only occurs while the hollow body 122 is stationary and flow stops when the hollow body 122 is moved as described herein.

Figure 3E:
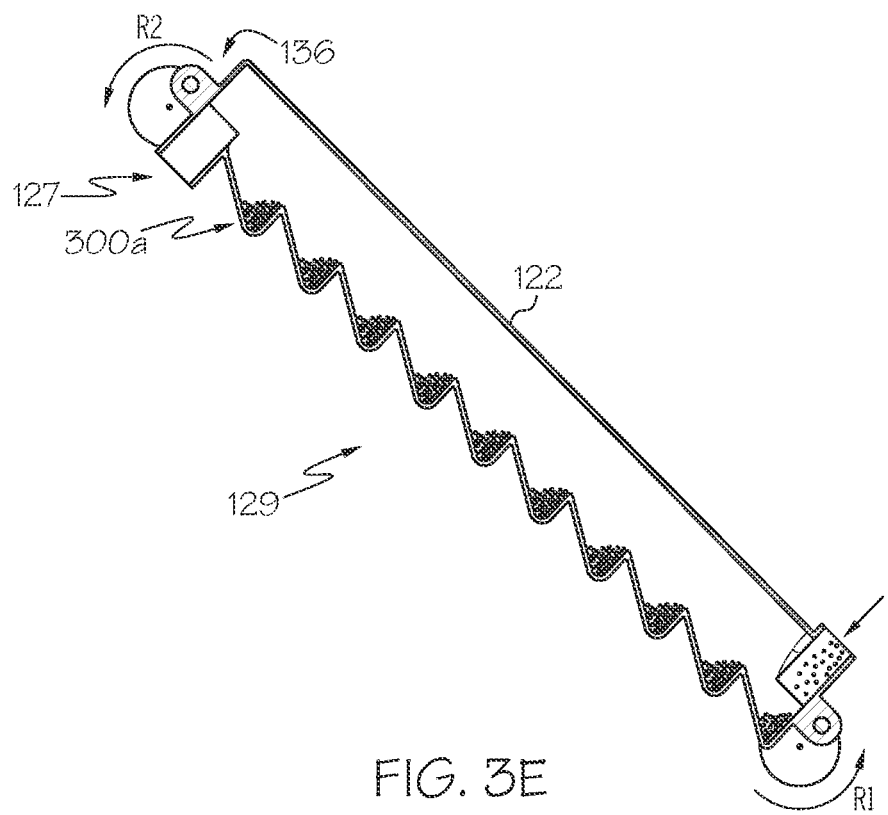
FIG. 3E depicts a cutaway side view of the raw material delivery device of FIG. 3A after having received raw material and moved the raw material up each of the steps due to the movement depicted in FIG. 3D according to one or more embodiments shown and described herein.
Figure 3F:
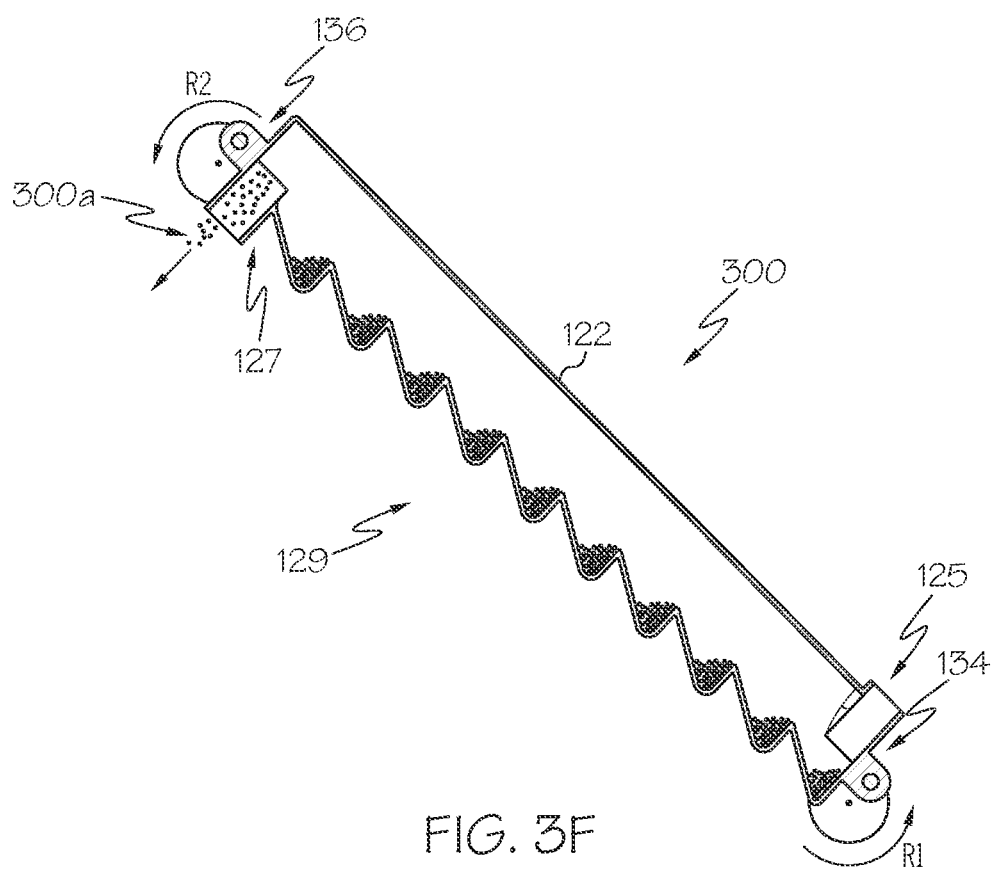
FIG. 3F depicts a cutaway side view of the raw material delivery device of FIG. 3A where raw material exits via the outlet due to the movement depicted in FIG. 3D according to one or more embodiments shown and described herein.

As depicted in FIGS. 3E and 3F, the raw material 300 is moved up each successive step 129 until it reaches the outlet 127 due to the movement in the first rotational direction Ri by the first rotary actuator 134 and movement in the second rotational direction R2 by the second rotary actuator 136, as described herein. Once the raw material 300 (specifically the first portion 300a thereof) reaches the outlet 127, the first portion 300a is ejected from the outlet 127, as particularly shown by the arrow extending from the outlet 127 in FIG. 3F.

It should be appreciated that the synchronous movement shown and described herein, together with a particular shape and size of each step 129 merely ensures that only some portion of the raw material 300 moves up each successive step from the inlet 125 to the outlet 127, which results in only portions of the raw material 300 being ejected onto the work surface 110 (FIGS. 1A-1B) at a time, so as to avoid situations where an excess amount of raw material 300 is dumped onto the work surface 110. Furthermore, as movement of the first rotary actuator 134 and the second rotary actuator 136 can be controlled, movement can be stopped if it is determined (e.g., via one or more sensors disposed within or near the build chamber, such as cameras, scales, or the like) that an excess amount of material is on the work surface 110 (FIGS. 1A-1B) and no more material is needed for the time being.

Referring again to FIGS. 1A-1B, the recovery chute 115 defines an upwardly-facing (e.g., facing the +Y direction) return opening that is positioned along the work surface 110. In the embodiment depicted in FIGS. 1A-1B, the upwardly-facing return opening of the recovery chute 115 is positioned along the work surface 110 to one side of (e.g., in the direction of the X-axis of the coordinate axes of FIGS. 1A-1B) the work surface 110 such that the recovery chute is generally aligned with the inlet 125 of the raw material delivery device 120. The recovery chute 115 includes one or more return sidewalls extending downwardly (e.g., in the -Y direction of the coordinate axes of FIGS. 1A-1B) from the work surface 110. In some embodiments, the one or more return sidewalls may extend between the work surface 110 and the inlet 125 of the raw material delivery device 120. In some embodiments, the one or more return sidewalls slope downwardly (e.g., in the -Y direction of the coordinate axes of FIGS. 1A-1B) from the work surface 110 to the inlet 125 of the raw material delivery device 120. The one or more return sidewalls therefore couple the work surface 110 to the inlet 125 such that raw material may flow from the work surface 110 to the inlet 125. A cross section of the recovery chute 115 may take any desirable shape to allow the flow of raw material therethrough. The downward slope of the one or more return sidewalls of the recovery chute 115 allows raw material from the work surface 110 to flow to an interior space of the recovery chute 115 (and into the raw material delivery device 120) under the influence of gravity.

The supply assembly 117 defines an downwardly-facing (e.g., facing the -Y direction) ramp or the like that is positioned along the work surface 110 to one side of (e.g., in the direction of the X-axis of the coordinate axes of FIGS. 1A-1B) the work surface 110 such that the supply assembly 117 is generally aligned with the outlet 127 of the raw material delivery device 120. The supply assembly 117 includes one or more delivery sidewalls extending downwardly (e.g., in the -Y direction of the coordinate axes of FIGS. 1A-1B) from the outlet 127 of the raw material delivery device 120. In some embodiments, the one or more delivery sidewalls may extend between the outlet 127 of the raw material delivery device 120 and the work surface 110. In some embodiments, the one or more delivery sidewalls slope downwardly (e.g., in the —Y direction of the coordinate axes of FIGS. 1A-1B) from the outlet 127 of the raw material delivery device 120 to the work surface 110. The one or more delivery sidewalls therefore couple the outlet 127 to the work surface 110 such that raw material may flow from the outlet 127 to the work surface 110. A cross section of the supply assembly 117 may take any desirable shape to allow the flow of raw material therethrough. The downward slope of the one or more delivery sidewalls of the supply assembly 117 allows raw material from the outlet 127 to flow onto the work surface 110 under the influence of gravity. In some embodiments, the supply assembly 117 may further include a dosing system that includes one or more actuable doors or the like that can be opened or closed to allow a particular amount of raw material to pass through at a time. Accordingly, as material exits the outlet 127 into the supply assembly 117, the dosing system permits only a portion of the material to be deposited on the work surface 110 at a time.

Still referring to FIGS. 1A-1B, the powder distributor 102 is generally arranged and configured to lay down and/or spread a layer of the raw material as the powder layer in the build envelope (e.g., on start plate or the work surface 110 within the build envelope). That is, the powder distributor 102 is arranged such that movement of the powder distributor 102 is in a horizontal plane defined by the x-axis and the z-axis of the coordinate axes depicted in FIGS. 1A-1B. For example, the powder distributor 102 may be an arm, rod, or the like that extends a distance in the +z/−z direction over or above the work surface 110. In some embodiments, the length of the powder distributor 102 may be longer than a width of the work surface 110 such that the powder layer can be distributed over an entirety of the work surface 110. In some embodiments, the powder distributor 102 may have a central axis in parallel with a top surface of the work surface 110 (e.g., generally parallel to the +x/−x axis of the coordinate axes of FIGS. 1A-1B). One or more motors, actuators, and/or the like may be coupled to the powder distributor 102 to effect movement of the powder distributor 102. For example, a rack and pinion actuator may be coupled to the powder distributor 102 to cause the powder distributor 102 to move back and forth over the work surface 110 in the +x/−x directions of the coordinate axes of FIGS. 1A-1B. In some embodiments, movement of the powder distributor 102 may be continuous (e.g., moving without stopping, other than to change direction). In other embodiments, movement of the powder distributor 102 may be stepwise (e.g., moving in a series of intervals, while stopping in between intervals for a period of time). In yet other embodiments, movement of the powder distributor 102 may be such that a plurality of interruptions occur between periods of movement.

The powder distributor 102 may further include one or more teeth 103 (e.g., rake fingers or the like) that extend from the powder distributor 102 into the raw material from the outlet 127 (e.g., via the supply assembly 117) to cause disruption of the raw material when the powder distributor 102 moves (e.g., to distribute the raw material, to spread the powder layer, etc.). For example, the powder distributor 102 may include a plurality of teeth 103 extending from a bottom surface of the powder distributor 102 (e.g., extending generally towards the −y direction of the coordinate axes of FIGS. 1A-1B). In some embodiments, the teeth 103 may extend in a direction that is substantially perpendicular to a plane of the work surface 110 (e.g., perpendicular to the plane formed by the x-axis and z-axis of the coordinate axes depicted in FIGS. 1A-1B). In another embodiment, the teeth 103 may be slanted with respect to the work surface 110. An angle of the slanted rake teeth 103 with respect to a normal to the work surface may be any value, and in some embodiments is between about 0° and about 45°. In some embodiments, each one of the plurality of rake teeth 103 may be a metal foil or a metal sheet. The total length of the plurality of teeth 103 may be longer than a width of the work surface 110 in order to make it possible to distribute powder on each position of the work surface 110 (e.g., over an entirety of the work surface 110). The teeth 103 may also be shaped and sized to rake through the raw material to distribute the powder layer on the work surface 110.

It should be understood that while the powder distributor 102 described herein generally extends a distance in the z direction of the coordinate axes depicted in FIGS. 1A-1B and moves in the +x/−x directions of the coordinate axes depicted in FIGS. 1A-1B to spread the powder layer as described herein, this is merely one illustrative example. Other configurations are also contemplated. For example, the powder distributor 102 may rotate about an axis to spread the powder layer, may articulate about one or more joints or the like to spread the powder layer, and/or the like without departing from the scope of the present disclosure.

In some embodiments, a cross section of the powder distributor 102 may be generally pentagonal, as depicted in FIG. 1B. However, it should be understood that the cross section may be any shape, including but not limited to, circular, elliptical, quadratic, polygonal (e.g., triangular, rectangular), or the like. A height of the powder distributor 102 may be set in order to give the powder distributor 102 a particular mechanical strength in the system vertical direction (e.g., along the +y/−y axis of the coordinate axes of FIGS. 1A-1B). That is, in some embodiments, the powder distributor 102 may have a particular controllable flex in the system vertical direction. The height of the powder distributor 102 may also be selected taking into account that the powder distributor 102 pushes an amount of the raw material. If the height of the powder distributor 102 is too small, the powder distributor 102 can only push forward a smaller amount relative to a higher power powder distributor 102. However, if the height of the powder distributor 102 is too high, the powder distributor 102 may complicate the powder catching from a scree of powder, (e.g., the higher the height of the powder distributor 102, the more force may be required in order to catch a predetermined amount of powder from the scree of powder by moving the powder distributor 102 into the scree of powder and letting a predetermined amount of powder fall over the top of the powder distributor 102 from a first side in the direction of travel into the scree of powder to a second side in the direction of the work surface 110).

In some embodiments, the powder distributor 102 may be communicatively coupled to a controller (not shown) that controls movement of the powder distributor 102 and/or controls movement of various other components such as the work surface 110 and/or the raw material delivery device 120. As used herein, the term "communicatively coupled" generally refers to any link in a manner that facilitates communications. As such, "communicatively coupled" includes both wireless and wired communications, including those wireless and wired communications now known or later developed. In embodiments where the powder distributor 102 is communicatively coupled to the controller, the controller may transmit one or more signals, data, and/or the like to cause the powder distributor 102 to move, change direction, change speed, and/or the like. For example, a "reverse direction" signal transmitted by the controller to the powder distributor 102 may cause the powder distributor 102 to reverse the direction in which it is moving (e.g., reverse movement in the +x direction of the coordinate axes of FIGS. 1A-1B to movement in the −x direction of the coordinate axes of FIGS. 1A-1B).

Each of the one or more raw material hoppers 140 may generally be containers that hold an amount of the raw material therein (e.g., a raw material supply source that supplies raw material) and contain an opening to dispense the raw material therefrom (e.g., into the inlet 125 of the raw material delivery device). While FIGS. 1A-1B depict one raw material hopper 140, the present disclosure is not limited to such. That is, any number of raw material hoppers 140 may be utilized without departing from the scope of the present disclosure. In some embodiments, the raw material hopper 140 may be located within an interior of a build chamber. In other embodiments, the raw material hopper 140 may be located outside or partially outside a build chamber. However, it should be understood that if a raw material hopper 140 is located outside or partially outside a build chamber, one or more outlets of the raw material hoppers that supply the raw material may be selectively sealed when not distributing the raw material in order to maintain a vacuum within a build chamber.

The shape and size of the raw material hopper 140 is not limited by the present disclosure. That is, the raw material hopper 140 may generally have any shape and or size without departing from the scope of the present disclosure. In some embodiments, the raw material hopper 140 may be shaped and/or sized to conform to the dimensions of a build chamber such that the raw material hopper 140 can fit inside a build chamber. In some embodiments, the one or more raw material hoppers 140 may be shaped and sized such that a collective volume of the raw material hoppers 140 is sufficient to hold an amount of raw material that is necessary to fabricate an article, which includes a sufficient amount of material to form each successive powder layer and additional material that makes up unfused raw material.

The raw material hopper 140 may generally have an outlet for ejecting the raw material located within the raw material hopper 140 such that the raw material is deposited within the inlet 125 of the raw material delivery device 120, as described herein. In some embodiments, such as the embodiment depicted in FIGS. 1A-1B, the raw material may freely flow out of the raw material hopper 140 under the force of gravity. In other embodiments, the outlets of the raw material hopper 140 may be selectively closed via a selective closing mechanism so as to only distribute a portion of the raw material located within the respective raw material hopper 140 at a particular time. Such a selective closing mechanism may be particularly useful in conjunction with the raw material delivery device 820 depicted in FIGS. 8A-8B, as described in greater detail herein.

Still referring to FIGS. 1A-1B, the raw material contained within the raw material hopper 140, moved by the raw material delivery device 120, and used to form an article on the work surface 110 is not limited by the present disclosure, and may generally be any raw material used for EBM now known or later developed. Illustrative examples of raw material includes, but is not limited to, pure metals such as titanium, aluminum, tungsten, or the like; and metal alloys such as titanium alloys, aluminum alloys, stainless steel, cobalt-chrome alloys, cobalt-chrome-tungsten alloys, nickel alloys, and/or the like. Specific examples of raw material include, but are not limited to, $Ti_6Al_4V$ titanium alloy, $Ti_6Al_4V$ ELI titanium alloy, Grade 2 titanium, and ASTM F75 cobalt-chrome (all available from Arcam AB, Mölndal, Sweden). Another specific example of raw material is INCONEL® alloy 718 available from Special Metals Corporation (Huntington W. Va.).

In embodiments, the raw material is pre-alloyed, as opposed to a mixture. This may allow classification of EBM with selective laser melting (SLM), where other technologies like selective laser sintering (SLS) and direct metal laser sintering (DMLS) require thermal treatment after fabrication. Compared to selective laser melting (SLM) and DMLS, EBM has a generally superior build rate because of its higher energy density and scanning method.

In some embodiments, the components described herein may be used to move other materials, including raw materials, used in other industries outside EBM. As such, the term "raw material" as used herein is not restricted to raw material used for EBM, may be other types of material such as, for example, harvested materials or seeds to be planted as used in the agriculture industry, materials used for construction such as concrete, asphalt, or the like, materials used for other non-EBM manufacturing systems, materials used for pharmaceutical manufacturing systems, and/or the like.

Figure 5C:
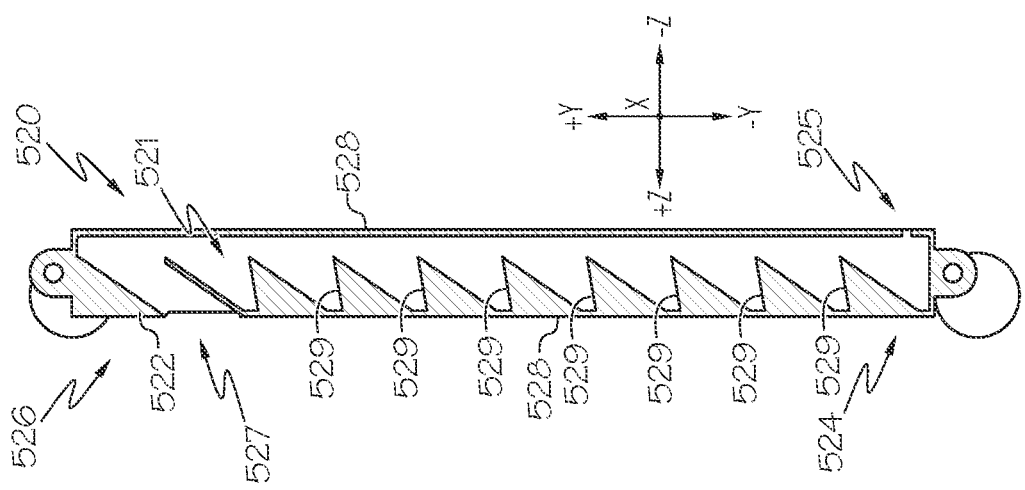
FIG. 5C depicts a cutaway side view of the raw material delivery device of FIG. 5A.
Figure 5B:
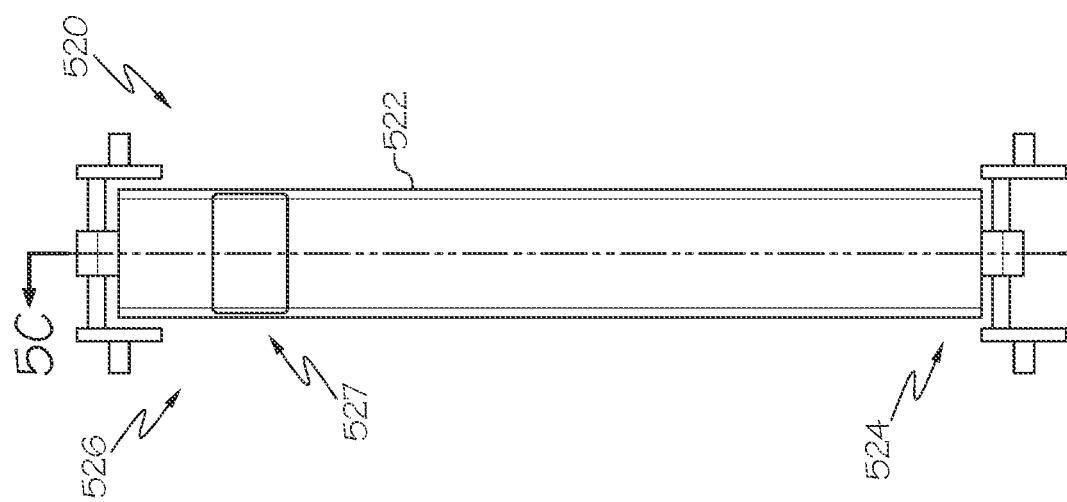
FIG. 5B depicts a front view of the raw material delivery device of FIG. 5A.
Figure 5A:
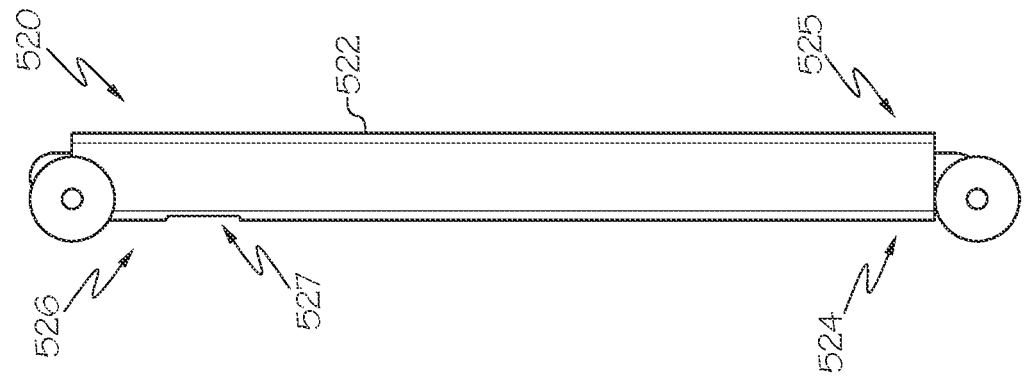
FIG. 5A depicts a side view of another illustrative raw material delivery device having deep steps and an angled outlet that allows for vertical arrangement according to one or more embodiments shown and described herein.
Figure 6C:
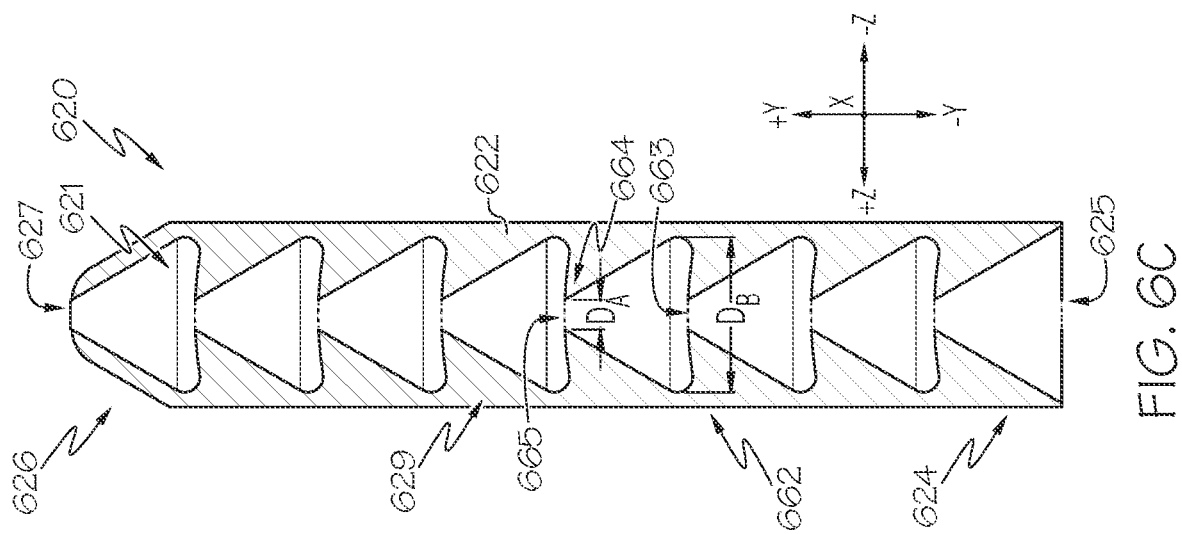
FIG. 6C depicts a cutaway side view of the raw material delivery device of FIG. 6A.
Figure 6B:
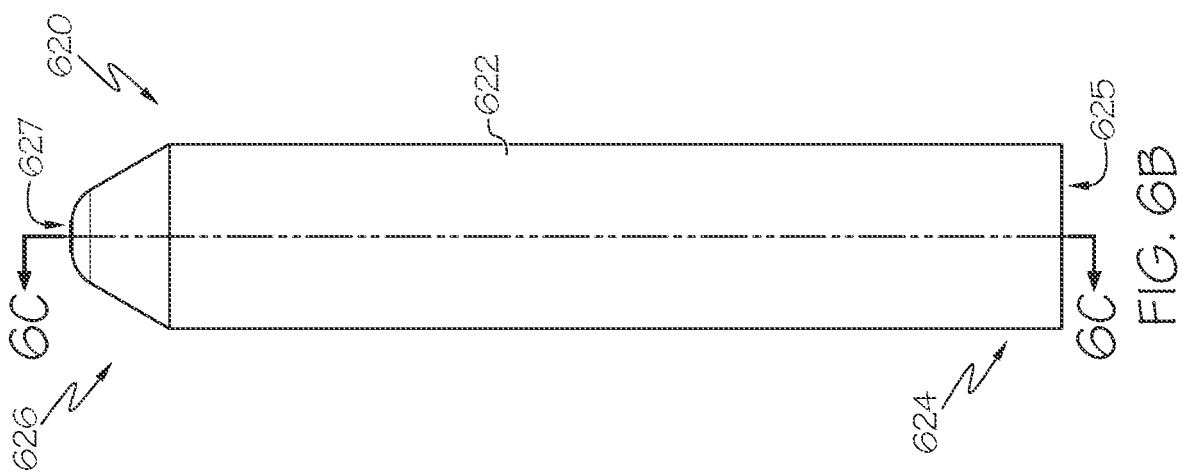
FIG. 6B depicts a front view of the raw material delivery device of FIG. 6A.
Figure 6A:
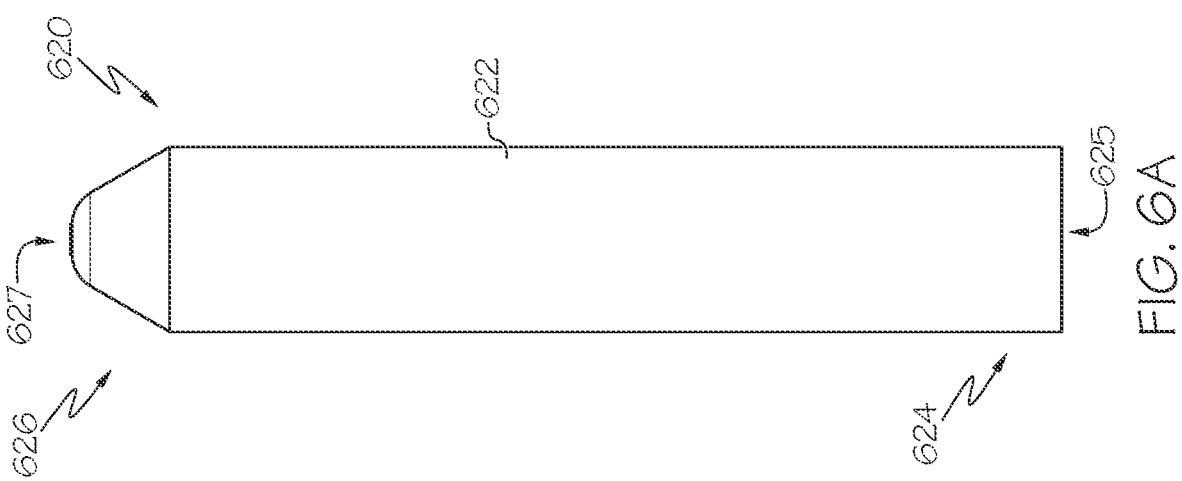
FIG. 6A depicts a side view of another illustrative raw material delivery device having steps with base and apex apertures according to one or more embodiments shown and described herein.

The embodiment depicted in FIGS. 1A-1B should now generally be understood. Accordingly, it should be appreciated that movement of the raw material delivery device 120 causes raw material to move from the first end 124 to the second end 126 of the hollow body 122 in a manner that portions of the raw material are ejected from the outlet 127 onto the work surface 110 so that the raw material can be distributed over the work surface 110 in a manner that avoids excessive buildup of material on the work surface 110. It should be understood that the raw material delivery device 120 depicted in FIGS. 1A-1B is merely illustrative, and other alternative raw material delivery devices may also be used without departing from the scope of the present disclosure. For example, FIG. 4 depicts a raw material delivery device 420 having one or more steps 429 with a sieve 450, FIGS. 5A-5C depict a raw material delivery device 520 that is arranged in a substantially vertical configuration, FIGS. 6A-6C depict a raw material delivery device 620 having base and apex apertures at each step, FIGS. 7A-7C depict a raw material delivery device 720 having a staggered step configuration, and FIGS. 8A-8B depict a raw material delivery device 820 having a spiral configuration of steps.

Figure 4:
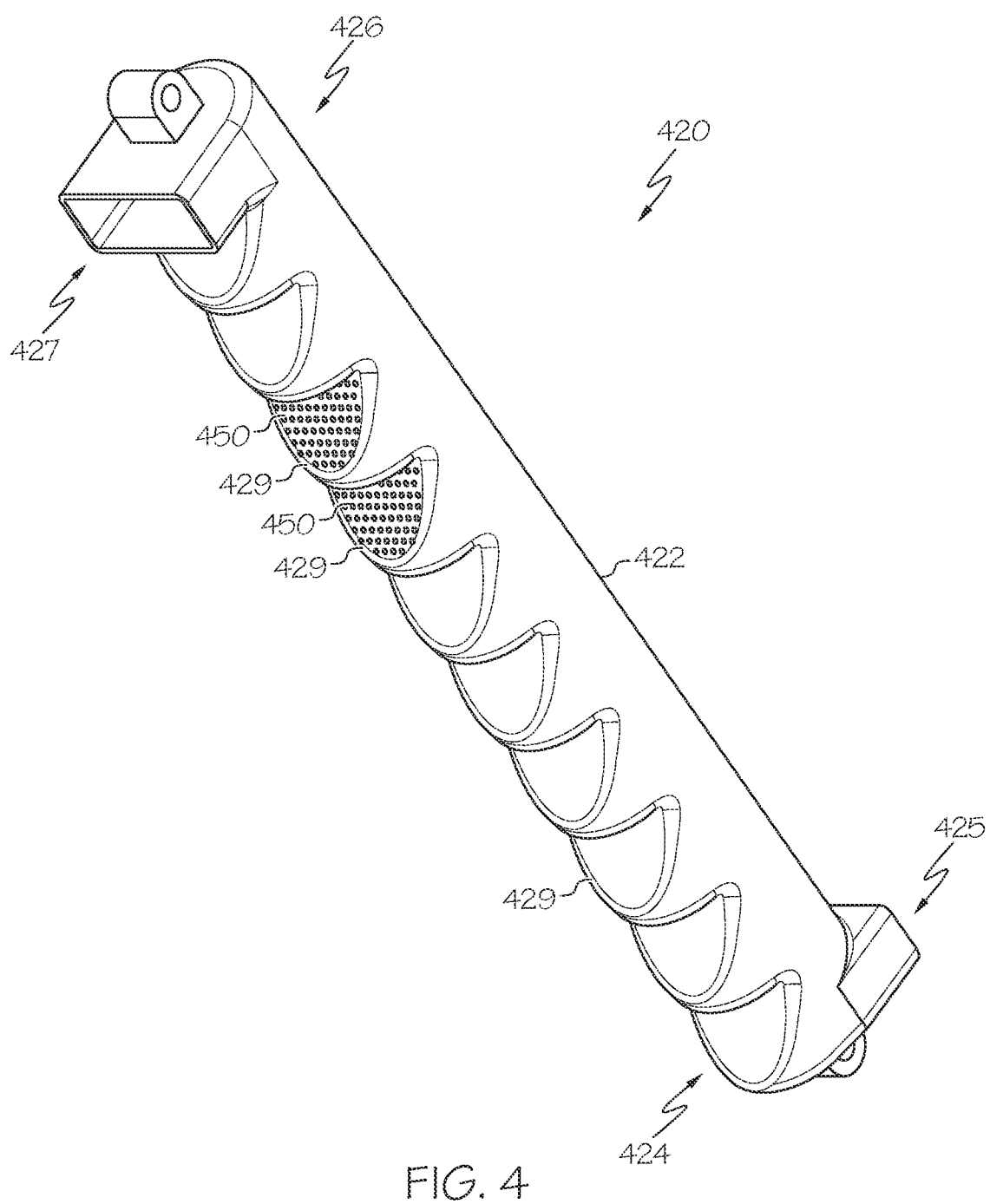
FIG. 4 depicts a perspective view of another illustrative raw material delivery device having a sieve according to one or more embodiments shown and described herein.

Referring now to FIG. 4, the raw material delivery device 420, similar to the raw material delivery device 120 depicted in FIGS. 1A-1B, is generally a component that includes a hollow body 422 having a first end 424 and a second end 426 spaced a distance from the first end 424. The raw material delivery device 420 is generally disposed within the additive manufacturing system 100 (FIGS. 1A-1B) as previously described herein with respect to the raw material delivery device 120 depicted in FIGS. 1A-1B, and is not discussed further for the purposes of brevity. Still referring to FIG. 4, the hollow body 422 of the raw material delivery device 420 is generally a body having a bore therethrough such that material can pass from one end to another end through the interior of the hollow body 422, as described in greater detail herein. In addition, the raw material delivery device 420 further includes an inlet 425 disposed at the first end 424 of the hollow body 422 and an outlet 427 disposed at the second end 426 of the hollow body 422. The inlet 425 and the outlet 427 are generally openings in the hollow body 422 that allow for the ingress and egress of material, such as the raw material discussed herein. That is, material may enter the hollow body 422 via the inlet 425 and may exit the hollow body 422 at least via the outlet 427 in some embodiments. The shape and size of the inlet 425 and the shape and size of the outlet 427 are not limited by the present disclosure, and may generally be any size, particularly sizes that allow for movement of a particular amount of material therethrough, as described herein.

The raw material delivery device 420 also includes a stepped passageway disposed within the hollow body 422 between the inlet 425 and the outlet 427. That is, the interior of the hollow body 422 includes one or more steps 429 that are particularly shaped, sized, and positioned to receive a portion of raw material thereon. One or more of the steps 429 of the stepped passageway includes a sieve 450 thereon. The sieve 450 on the steps 429 is particularly shaped and sized such that particles of raw material having a predetermined size (e.g., a size smaller than a particular size threshold defined by the sieve 450) are allowed to pass through onto the work surface 110 (FIGS. 1A-1B) by falling under force of gravity through the sieve 450 onto the work surface. However, other particles that have another predetermined size (e.g., a size larger than the particular size defined by the sieve 450) continue to move up the stepped passageway as described herein. Accordingly, the particles that have the other predetermined size that prevents passage through the sieve 450 exit the hollow body 422 into another receptacle instead of being deposited on the work surface 110. For example, the particles having the other predetermined size may exit the hollow body 422 via the outlet 427 into a waste receptacle or the like. While FIG. 4 depicts the sieve 450 being located on each of the steps 429, the present disclosure is not limited to such. In some embodiments, the sieve 450 may be located in other locations, such as, for example, at the outlet 427, as a portion of the supply assembly 117 (FIG. 1A), disposed in between the outlet 427 and the supply assembly 117 (FIG. 1A), and/or the like.

While not depicted in FIG. 4, the raw material delivery device 420 further includes rotary actuators that move the raw material delivery device 420 in a manner described herein with respect to the raw material delivery device 120 of FIGS. 1A-1B.

Referring now to FIGS. 5A-5C, the raw material delivery device 520, similar to the raw material delivery device 120 depicted in FIGS. 1A-1B, is generally a component that includes a hollow body 522 having a first end 524 and a second end 526 spaced a distance from the first end 524. The raw material delivery device 520 is generally disposed within the additive manufacturing system 100 (FIGS. 1A-1B) as previously described herein with respect to the raw material delivery device 120 depicted in FIGS. 1A-1B, and is not discussed further for the purposes of brevity. Still referring to FIGS. 5A-5C, the hollow body 522 of the raw material delivery device 520 is generally a body having a bore therethrough such that material can pass from one end to another end through the interior 521 of the hollow body 522, as described in greater detail herein. In addition, the raw material delivery device 520 further includes an inlet 525 disposed at the first end 524 of the hollow body 522 and an outlet 527 disposed at the second end 526 of the hollow body 522. The inlet 525 and the outlet 527 are generally openings in the hollow body 522 that allow for the ingress and egress of material, such as the raw material discussed herein. That is, material may enter the hollow body 522 via the inlet 525 and may exit the hollow body 522 via the outlet 527 in some embodiments. The shape and size of the inlet 525 and the shape and size of the outlet 527 are not limited by the present disclosure, and may generally be any size, particularly sizes that allow for movement of a particular amount of material therethrough, as described herein.

Referring particularly to FIG. 5C, the raw material delivery device 520 also includes a stepped passageway disposed within the hollow body 522 between the inlet 525 and the outlet 527. That is, the interior 521 of the hollow body 522 includes one or more steps 529 that are particularly shaped, sized, and positioned to receive a portion of raw material thereon. The steps 529 differ from the steps 129 depicted in FIGS. 3A-3E in arrangement. More specifically, the steps 529 of the raw material delivery device 520 depicted in FIG. 5C are positioned such that the raw material delivery device 520 is oriented to extend substantially vertically (e.g., substantially aligned with the Y-axis of the coordinate axes of FIG. 5C). That is, as depicted in FIG. 5C, each step 529 generally extends in a direction that is normal to the direction of the orientation of the raw material delivery device 520 (e.g., the steps 529 generally extend in a direction parallel to the Z-axis of the coordinate axes of FIG. 5C). Each step 529 is connected to the next successive step 529 via a slanted wall that guides movement of the raw material when it is thrown or bumped upwards via movement of the raw material delivery device 520, as discussed in greater detail herein.

While not depicted in FIGS. 5A-5C, the raw material delivery device 520 further includes rotary actuators that move the raw material delivery device 520 in a manner described herein with respect to the raw material delivery device 120 of FIGS. 1A-1B.

Referring now to FIGS. 6A-6C, the raw material delivery device 620, similar to the raw material delivery device 120 depicted in FIGS. 1A-1B, is generally a component that includes a hollow body 622 having a first end 624 and a second end 626 spaced a distance from the first end 624. The raw material delivery device 620 is generally disposed within the additive manufacturing system 100 (FIGS. 1A-1B) as previously described herein with respect to the raw material delivery device 120 depicted in FIGS. 1A-1B, and is not discussed further for the purposes of brevity. Still referring to FIGS. 6A-6C, the hollow body 622 of the raw material delivery device 620 is generally a body having a bore therethrough such that material can pass from one end to another end through the interior 621 of the hollow body 622, as described in greater detail herein. In addition, the raw material delivery device 620 further includes an inlet 625 disposed at the first end 624 of the hollow body 622 and an outlet 627 disposed at the second end 626 of the hollow body 622. The inlet 625 and the outlet 627 are generally openings in the hollow body 622 that allow for the ingress and egress of material, such as the raw material discussed herein. That is, material may enter the hollow body 622 via the inlet 625 and may exit the hollow body 622 via the outlet 627 in some embodiments. The shape and size of the inlet 625 and the shape and size of the outlet 627 are not limited by the present disclosure, and may generally be any size, particularly sizes that allow for movement of a particular amount of material therethrough, as described herein.

Referring particularly to FIG. 6C, the raw material delivery device 620 also includes a stepped passageway disposed within the hollow body 622 between the inlet 625 and the outlet 627. That is, the interior 621 of the hollow body 622 includes one or more steps 629 that are particularly shaped, sized, and positioned to receive a portion of raw material thereon. Each one of the steps 629 includes a base 662 having a base aperture 663 therein and an apex 664 comprising an apex aperture 665 therein. The hollow body 622 is oriented in a substantially vertical configuration (e.g., aligned with the Y-axis of the coordinate axes of FIG. 6C) such that, when traversing the raw material delivery device 620 from the first end 624 to the second end 626 in the +Y, the apex aperture 665 of the apex 664 of each step 629 is fluidly coupled to the base aperture 663 of the base 662 of the next step 629. As such, the apertures 663, 665 allow the raw material to be passed between steps 629 when the raw material delivery device 620 is moved in a linear motion in the vertical direction (e.g., up and down in the +Y/−Y directions of the coordinate axes of FIG. 6C). The apertures 663, 665 are generally shaped and sized to allow passage of raw material therethrough. Accordingly, in some embodiments, the base aperture 663 may have a diameter that is substantially the same as a diameter of the apex aperture 665. In other embodiments, the base aperture 663 may have a different diameter (e.g., may be smaller or larger) than the diameter of the apex aperture 665.

Still referring to FIG. 6C, the base 662 of each step generally has a base diameter $D_B$ that is larger than a diameter of the base aperture 663. As such, the base 662 includes a surface around the base aperture 663 upon which raw material can rest when it is thrown or bumped upwards through the base aperture 663 from beneath the base 662. In addition, the base diameter $D_B$ is generally larger than an apex diameter $D_A$ such that one or more sidewalls extending between the base 662 and the apex 664 are slanted or curved inwardly from the base 662 to the apex 664 to guide movement of raw material supported on the base 662 upwards through the apex aperture 665. In some embodiments, the apex aperture 665 may have a diameter that generally corresponds to the apex diameter $D_A$.

While not depicted in FIGS. 6A-6C, the raw material delivery device 620 further includes linear actuators that move the raw material delivery device 620 in a manner described herein (e.g., in the +Y/−Y directions of FIG. 6C).

Referring now to FIGS. 7A-7C, the raw material delivery device 720, similar to the raw material delivery device 120 depicted in FIGS. 1A-1B, is generally a component that includes a hollow body 722 having a first end 724 and a second end 726 spaced a distance from the first end 724. The raw material delivery device 720 is generally disposed within the additive manufacturing system 100 (FIGS. 1A-1B) as previously described herein with respect to the raw material delivery device 120 depicted in FIGS. 1A-1B, and is not discussed further for the purposes of brevity. Still referring to FIGS. 7A-7C, the hollow body 722 of the raw material delivery device 720 is generally a body having a bore therethrough such that material can pass from one end to another end through the interior 721 of the hollow body 722, as described in greater detail herein. In addition, the raw material delivery device 720 further includes an inlet 725 disposed at the first end 724 of the hollow body 722 and an outlet 727 disposed at the second end 726 of the hollow body 722. The inlet 725 and the outlet 727 are generally openings in the hollow body 722 that allow for the ingress and egress of material, such as the raw material discussed herein. That is, material may enter the hollow body 722 via the inlet 725 and may exit the hollow body 722 via the outlet 727 in some embodiments. The shape and size of the inlet 725 and the shape and size of the outlet 727 are not limited by the present disclosure, and may generally be any size, particularly sizes that allow for movement of a particular amount of material therethrough, as described herein.

Referring particularly to FIG. 7C, the raw material delivery device 720 also includes a staggered stepped passageway disposed within the hollow body 722 between the inlet 725 and the outlet 727. That is, the interior 721 of the hollow body 722 includes one or more staggered steps 729 that include a first set of steps 729a positioned opposite a second set of steps 729b, each of which are particularly shaped, sized, and positioned to receive a portion of raw material thereon. The steps 729 are substantially similar to the steps 529 depicted in FIG. 5C, but instead of being on one side of the interior 721, the steps are located on two sides of the interior 721 (e.g., the first set of steps 729a located on a first side and the second set of steps 729b located on a second side opposite the first side. The steps 729 of the raw material delivery device 720 depicted in FIG. 7C are positioned such that the raw material delivery device 720 is oriented to extend substantially vertically (e.g., substantially aligned with the Y-axis of the coordinate axes of FIG. 7C). That is, as depicted in FIG. 7C, each step 729 generally extends in a direction that is normal to the direction of the orientation of the raw material delivery device 720 (e.g., the steps 729 generally extend in a direction parallel to the Z-axis of the coordinate axes of FIG. 7C). Each step 729 is connected to the next successive step 729 via a slanted wall that guides movement of the raw material when it is thrown or bumped upwards via linear movement of the raw material delivery device 720 in a vertical direction (e.g., up and down in the +Y/−Y directions of the coordinate axes of FIG. 7C). The first set of steps 729a are generally positioned with respect to the second set of steps 729b such that each step 729 from either set is not aligned with a step 729 from the other set, thereby providing a staggered orientation as shown in FIG. 7C.

While not depicted in FIGS. 7A-7C, the raw material delivery device 720 further includes linear actuators that move the raw material delivery device 720 in a manner described herein (e.g., in the +Y/−Y directions of FIG. 7C).

Referring now to FIGS. 8A-8B, the raw material delivery device 820, similar to the raw material delivery device 120 depicted in FIGS. 1A-1B, is generally a component that includes a hollow body 822 having a first end 824 and a second end 826 spaced a distance from the first end 824 with a stepped passageway. FIGS. 8A-8B depicts the hollow body 822 as being a partially hollow body where the hollow body 822 is divided into two portions spaced apart from each other such that there is a gap between portions such that the stepped passage is exposed between portions. However, this is merely illustrative and in some embodiments, the hollow body 822 may be a single piece hollow body. The raw material delivery device 820 is generally disposed within the additive manufacturing system 100 (FIGS. 1A-1B) as previously described herein with respect to the raw material delivery device 120 depicted in FIGS. 1A-1B, and is not discussed further for the purposes of brevity. Still referring to FIGS. 8A-8B, the hollow body 822 of the raw material delivery device 820 is generally a body having a bore therethrough such that material can pass from one end to another end through the hollow body 822, as described in greater detail herein. In addition, the raw material delivery device 820 further includes an inlet 825 disposed at the first end 824 of the hollow body 822 and an outlet 827 disposed at the second end 826 of the hollow body 822. The inlet 825 and the outlet 827 are generally openings in the hollow body 822 that allow for the ingress and egress of material, such as the raw material discussed herein. That is, material may enter the hollow body 822 via the inlet 825 and may exit the hollow body 822 via the outlet 827 in some embodiments. The shape and size of the inlet 825 and the shape and size of the outlet 827 are not limited by the present disclosure, and may generally be any size, particularly sizes that allow for movement of a particular amount of material therethrough, as described herein. In some embodiments, the inlet 825 may be a hopper or similar design that receives bulk portions of raw material at a time, the bulk material being divided up into portions for delivery to the outlet 827, as described herein.

The raw material delivery device 820 also includes a stepped passageway disposed within the hollow body 822 between the inlet 825 and the outlet 827. The stepped passageway comprises a plurality of steps 829 arranged in a spiral or helical configuration around a core 870. The core 870 is rotatable about an axis A disposed through the center of the core 870 and extending in a substantially vertical configuration (e.g., extending along the Y-axis of the coordinate axes of FIG. 8B). It should appreciated that the arrangement of the steps 829 around the core 870 is akin to a screw having threads disposed thereon. As the core 870 and the steps 829 are rotated around the axis A, the rotation may abruptly stop or rapidly decelerate, thereby causing the material to be thrown upwards to one or more subsequent steps of the stepped passageway. As this process is repeated one or more times, the material eventually moves from the inlet 825 to the outlet 827. To effect rotational movement around the axis A, the core may have a first extension portion 872 and/or a second extension portion 874 protruding from opposite ends of the core 870. While FIG. 8B depicts both the first extension portion 872 and the second extension portion 874, the present disclosure is not limited to such. That is, the core 870 may only have a single extension portion protruding therefrom or no extension portions protruding therefrom. The extension portions 872, 874 engage with one or more rotary actuators 880 that effect a rotational movement of the core 870, thereby causing the rotary movement. In some embodiments, the extension portions 872, 874 may engage with a detent, a stop, or the like, one or more portions of the core 870 and/or the extension portions 872, 874 may be coupled to a braking mechanism, the rotary actuators 880 may include a detent, stop, or braking mechanism, and/or the like to effect the abrupt stop of the rotational movement to cause the raw material to be thrown.

The one or more rotary actuators 880 are generally any type of actuator that can cause the rotational movement noted above, and are not limited by the present disclosure. Illustrative examples components that can be used to cause rotational movement include, but are not limited to, stepper motors, servomotors, fluid power actuators (e.g., hydraulic or pneumatic actuator), vacuum actuators, and/or the like. In another example, a linear actuator coupled to a rotating disc may be used to cause a rotational movement. In some embodiments, the one or more rotary actuators 880 may include a detent, stop, braking mechanism, or the like that causes the abrupt stop of rotational movement, as discussed herein. Other examples not specifically recited herein are contemplated and are included within the scope of the present disclosure.

The general structure of the additive manufacturing system, particularly that of the raw material delivery device, should now generally be understood. In each of the embodiments described herein, the raw material delivery device moves raw material from a relatively lower location (e.g., beneath the work surface) to a relatively higher location (e.g., above the work surface) to ensure compactness of the apparatus, to shield certain components from the harsh environments, and/or to ensure only portions of raw material are delivered to the work surface at a particular time.

Referring again to FIGS. 1A-1B, in operation, during a work cycle, the work surface 110 (e.g., a build platform) may be lowered successively or otherwise moved in relation to an EB gun disposed over the work surface 110 (e.g., in the −y direction of the coordinate axes depicted in FIGS. 1A-1B) after each added raw material layer is placed. This means that the work surface 110 starts in an initial position, in which a first layer of a particular thickness is laid down on the work surface 110. In some embodiments, the first layer may be thicker than the other applied layers, so as to avoid a melt-through of the first layer onto the work surface 110. The work surface is thereafter lowered (or the distance between the work surface 110 and the EB gun is increased) in connection with laying down a second layer for the formation of a new cross section of an article. In an example embodiment, the article may be formed through successive fusion of layers the raw material supplied from the raw material delivery device 120 on the work surface 110 (e.g., successive fusion of layers of material), as described herein with respect to FIG. 9. Still referring to FIGS. 1A-1B, each layer corresponds to successive cross sections of the article. Such a fusion may be particularly completed based on instructions generated from a model of the article. In some embodiments, the model may be generated via a CAD (Computer Aided Design) tool.

In embodiments, an EB gun (or plurality of EB guns) generates an electron beam that, when contacting the raw material located on the work surface 110, melts or fuses together the raw material to form a first layer of material on the work surface 110. In some embodiments, a controller (not shown) may be used for calibrating, controlling, and managing the electron beam emitted from the EB gun, controlling movement of the raw material delivery device 120 as described herein, controlling opening and closing of apertures that deliver material to the inlet 125 of the raw material delivery device 120, controlling movement of the powder distributor 102, and/or controlling movement of the work surface 110 by transmitting one or more signals and/or data to each of the components.

In embodiments, a particular amount of raw material may be provided on the work surface 110 via the raw material delivery device 120 as described herein, thereby creating a scree of raw material on the work surface 110. The raw material exiting the outlet 127 may be collected by the powder distributor 102 by moving the powder distributor 102 a particular distance in a first direction (e.g., in a direction along the plane formed by the x-axis and the z-axis of the coordinate axes depicted in FIGS. 1A-1B) into the scree of the raw material, thereby allowing a particular amount of the raw material to fall over a top of the powder distributor 102. The powder distributor 102 is then moved in a second direction (e.g., in another direction along the plane formed by the x-axis and the z-axis of the coordinate axes depicted in FIGS. 1A-1B). In some embodiments, the second direction may be opposite to the first direction. Movement of the powder distributor 102 in the second direction may remove the particular amount of the raw material, which has fallen over the top of the powder distributor 102, from the scree of the raw material. The particular amount of the raw material removed from the scree of the raw material (or provided by any other suitable mechanism) in front of the powder distributor 102 (e.g., adjacent to a leading end of the powder distributor 102) may be moved over the work surface 110 by means of the powder distributor 102.

The electron beam emitted from the EB gun may be directed over the work surface 110, thereby causing the layer to fuse in particular locations to form a first cross section of the article according to the model generated via the CAD tool. The movement of the electron beam is controlled by the EB gun such that the electron beam is directed over work surface 110 based on instructions provided by a controller or the like. After a first layer is finished (e.g., after the fusion of raw material for making a first layer of the article), a second layer is provided on the first layer. The second layer may be distributed according to the same manner as the previous layer, as described herein. However, in some embodiments, there might be alternative methods in the same additive manufacturing machine for distributing the raw material. For instance, a first layer may be provided by means of a first powder distributor and a second layer may be provided by a second powder distributor.

After the second layer is distributed on the first powder layer, the electron beam is directed over the work surface 110, causing the second layer to fuse in selected locations to form a second cross section of the article. Fused portions in the second layer may be bonded to fused portions of the first layer. The fused portions in the first and second layer may be melted together by melting not only the material in the uppermost layer but also remelting at least a portion of a thickness of a layer directly below the uppermost layer.

FIG. 9 schematically depicts a block diagram of an illustrative method 900 of moving raw material through the raw material delivery devices described herein (e.g., supplying the raw material to the work surface 110 (FIGS. 1A-1B) by way of the various raw material delivery devices described herein).

The method 900 includes a step of suppling the raw material to the inlet disposed on the first end of the raw material delivery device at block 902. That is, raw material is supplied via a material hopper, a recovery chute, and/or the like, as described herein. Supplying the raw material to the input may include opening one or more gates or the like to allow raw material to flow into the interior of the raw material delivery device, as described herein.

At block 904, one or more actuators are actuated to cause the raw material to move up the steps. This step may include actuating the movement of two actuators to cause the raw material to be bumped or thrown up steps as described herein with respect to the embodiments of FIGS. 1A-1B, 2, 3A-3F, 4, and 5A-5C, may include causing a linear motion to cause the raw material to be bumped up as described herein with respect to the embodiments of FIGS. 6A-6C and 7A-7C, or may include actuating one or more actuators to rotate the core and subsequently brought to an abrupt stop to cause raw material to be carried up the threaded steps as described herein with respect to FIGS. 8A-8B. In some embodiments, the raw material may be distributed through sieves in the steps as a result of the movement, as described herein.

As raw material may be continuously delivered, it may be necessary to continuously supply additional raw material for movement up the stepped passageway. As such, at block 906, a decision is made as to whether additional raw material is to be supplied. Such a determination may generally be made based on build parameters, an amount of raw material present on the work surface, and/or the like, and may be automatically completed by obtaining information from sensors and deciding whether additional material is needed. If additional raw material is needed, the process repeats at block 902 and may continue to repeat as many times as necessary to move raw material during a build process. If no additional raw material is needed (e.g., an end of a build process has been reached), the process may proceed to block 908.

After making its way up the stepped passageway due to the movement of the raw material delivery devices described herein, the raw material may exit the raw material delivery device (e.g., via the outlet thereof) and become deposited on the work surface. Thereafter, at block 908, the raw material is distributed across the work surface by the powder distributor, as described in greater detail herein.

It should now be understood that that the devices, systems, and methods described herein allow for movement of raw materials in an additive manufacturing system or similar system via a raw material delivery device that includes a stepped passageway that delivers the raw material from a first location to a second location, with the second location generally being at or near the work surface such that the raw material can be disposed on the work surface for the build process. The first location may be an area located elsewhere, such as near a powder hopper or other supply source that supplies powder and/or a powder recovery chute that collects excess powder that has been removed from the work surface. The stepped passageway is at least partially disposed within a hollow body of the raw material delivery device, and the raw material delivery device is configured in one of a plurality of different ways to move to cause a portion of raw material to move from each step to the next from the first location to the second location, thereby ensuring only the portion of the raw material is deposited on the work surface at a time. As a result, less material is used on the work surface at a time such that less excess or waste material (e.g., unused material) is produced, resulting in a more efficient use of material in additive manufacturing processes and ensuring less material is scattered throughout a build chamber during a build process, which may result in more accurate building of an article relative to traditional additive manufacturing systems.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses:

1. A raw material delivery device, comprising: a hollow body comprising a first end and a second end, the second end disposed above the first end in a system vertical direction; an inlet disposed at the first end of the hollow body; an outlet disposed at the second end of the hollow body; and a stepped passageway disposed within the hollow body between the inlet and the outlet, the stepped passageway configured to deliver raw material via one or more steps from the inlet to the outlet.

2. The raw material delivery device of any preceding clause, wherein the inlet is coupled to a raw material supply source that supplies the raw material.

3. The raw material delivery device of any preceding clause, wherein the outlet is positioned adjacent to a portion of a build platform of an additive manufacturing system such that raw material exiting the outlet is deposited on the build platform.

4. The raw material delivery device of any preceding clause, further comprising a first rotary actuator coupled to the first end of the hollow body and a second rotary actuator coupled to the second end of the hollow body, the first and second rotary actuators configured to synchronously rotate the first end and the second end to shake the hollow body such that one or more portions of raw material entering the hollow body at the inlet moves up the one or more steps toward the outlet.

5. The raw material delivery device of any preceding clause, wherein the one or more steps of the stepped passageway comprise a sieve that allows particles of the raw material having a predetermined size to exit the hollow body prior to reaching the outlet.

6. The raw material delivery device of any preceding clause, wherein the outlet is coupled to a waste receptacle such that raw material exiting the outlet is deposited within the waste receptacle.

7. The raw material delivery device of any preceding clause, wherein the raw material delivery device is disposed at an angle relative to the system vertical direction.

8. The raw material delivery device of any preceding clause, wherein the raw material delivery device is disposed in a vertical configuration that is substantially parallel to the system vertical direction.

9. The raw material delivery device of any preceding clause, wherein the one or more steps are arranged in a staggered step configuration.

10. The raw material delivery device of any preceding clause, wherein the one or more steps are arranged in a spiral configuration.

11. The raw material delivery device of any preceding clause, further comprising a rotary actuator that rotates the one or more steps about an axis and stops or slows movement to move the raw material from the inlet to the outlet.

12. The raw material delivery device of any preceding clause, wherein: each one of the one or more steps comprises: a base comprising a base aperture, and an apex comprising an apex aperture; and the base has a base diameter that is greater than an apex diameter of the apex and greater than a diameter of the base aperture.

13. An additive manufacturing system, comprising: a work surface; and a raw material delivery device disposed adjacent to the work surface, the raw material delivery device comprising: a hollow body comprising a first end and a second end, the second end disposed above the first end in a system vertical direction, an inlet disposed at the first end of the hollow body, an outlet disposed at the second end of the hollow body, and a stepped passageway disposed within the hollow body between the inlet and the outlet, the stepped passageway configured to deliver raw material via one or more steps from the inlet to the outlet.

14. The additive manufacturing system of any preceding clause, further comprising a raw material supply source, wherein the inlet is coupled to the raw material supply source such that the raw material supply source supplies the raw material to the raw material delivery device via the inlet.

15. The additive manufacturing system of any preceding clause, further comprising a recovery chute coupled between the work surface and the inlet of the raw material delivery device such that material deposited in the recovery chute from the work surface flows into the inlet of the raw material delivery device.

16. The additive manufacturing system of any preceding clause, wherein the outlet of the raw material delivery device is positioned adjacent to a portion of the work surface such that raw material exiting the outlet is deposited on the work surface.

17. The additive manufacturing system of any preceding clause, further comprising a powder distributor disposed over a portion of the work surface, the powder distributor arranged to spread the raw material deposited on the work surface from the outlet.

18. The additive manufacturing system of any preceding clause, wherein the raw material delivery device further comprises a first rotary actuator coupled to the first end of the hollow body and a second rotary actuator coupled to the second end of the hollow body, the first and second rotary actuators configured to synchronously rotate the first end and the second end to shake the hollow body such that one or more portions of raw material entering the hollow body at the inlet moves up the one or more steps toward the outlet.

19. The additive manufacturing system of claim 13, wherein the one or more steps of the stepped passageway comprise a sieve that allows particles of the raw material having a predetermined size to exit the hollow body prior to reaching the outlet.

20. The additive manufacturing system of any preceding clause, further comprising a waste receptacle, wherein the outlet is coupled to the waste receptacle such that raw material exiting the outlet is deposited within the waste receptacle.

21. The additive manufacturing system of any preceding clause, wherein the raw material delivery device is disposed at an angle relative to the system vertical direction.

22. The additive manufacturing system of any preceding clause, wherein the raw material delivery device is disposed in a vertical configuration that is substantially parallel to the system vertical direction.

23. The additive manufacturing system of any preceding clause, wherein the one or more steps are arranged in a staggered step configuration.

24. The additive manufacturing system of any preceding clause, wherein the one or more steps are arranged in a spiral configuration.

25. The additive manufacturing system of any preceding clause, wherein the raw material delivery device further comprises a rotary actuator that rotates the one or more steps about an axis and stops or slows movement to move the raw material from the inlet to the outlet.

26. The additive manufacturing system of any preceding clause, wherein: each one of the one or more steps comprises: a base comprising a base aperture, and an apex comprising an apex aperture; and the base has a base diameter that is greater than an apex diameter of the apex and greater than a diameter of the base aperture.

27. The additive manufacturing system of any preceding clause, further comprising: a supply assembly disposed between the outlet and the work surface; and a sieve disposed between the outlet and the supply assembly or within the supply assembly.

28. A method of supplying raw material to a work surface of an additive manufacturing system, the method comprising: supplying the raw material to an inlet of a raw material delivery device, the inlet disposed at a first end of a hollow body; and actuating one or more actuators of the raw material delivery device such that the raw material supplied to the inlet moves up a stepped passageway disposed within the hollow body from the inlet to an outlet disposed at a second end of the hollow body that is located above the first end of the hollow body in a system vertical direction.

29. The method of any preceding clause, further comprising repeating the supplying and actuating to move additional raw material up the stepped passageway from the inlet to the outlet.

30. The method of any preceding clause, further comprising distributing the raw material on the work surface after the material exits the raw material delivery device onto the work surface.

31. The method of any preceding clause, wherein the raw material exits the work surface via a sieve on one or more steps of the stepped passageway or via the outlet of the hollow body.

32. The method of any preceding clause, wherein actuating the one or more actuators comprises synchronously rotating a first rotary actuator coupled to the first end of the hollow body and a second rotary actuator coupled to the second end of the hollow body to shake the hollow body such that one or more portions of raw material entering the hollow body at the inlet moves up one or more steps of the stepped passageway toward the outlet.

33. The method of any preceding clause, wherein actuating the one or more actuators comprises causing one or more rotary actuators to rotate one or more steps of the stepped passageway about an axis and stops or slows movement to move the raw material from the inlet to the outlet.

What is claimed is:

1. A raw material delivery device, comprising:
a hollow body comprising a first end and a second end, the second end disposed above the first end in a system vertical direction;
an inlet disposed at the first end of the hollow body;
an outlet disposed at the second end of the hollow body;
a stepped passageway disposed within the hollow body between the inlet and the outlet, the stepped passageway; and
a first rotary actuator coupled to the first end of the hollow body and a second rotary actuator coupled to the second end of the hollow body, the first and second rotary actuators configured to synchronously rotate the first end and the second end to shake the hollow body such that one or more portions of raw material entering the hollow body at the inlet moves via the one or more steps toward the outlet.

2. The raw material delivery device of claim 1, wherein the inlet is coupled to a raw material supply source that supplies the raw material.

3. The raw material delivery device of claim 1, wherein the outlet is positioned adjacent to a portion of a build platform of an additive manufacturing system such that raw material exiting the outlet is deposited on the build platform.

4. The raw material delivery device of claim 1, wherein the one or more steps of the stepped passageway comprise a sieve that allows particles of the raw material having a predetermined size to exit the hollow body prior to reaching the outlet.

5. The raw material delivery device of claim 4, wherein the outlet is coupled to a waste receptacle such that raw material exiting the outlet is deposited within the waste receptacle.

6. The raw material delivery device of claim 1, wherein the raw material delivery device is disposed at an angle relative to the system vertical direction.

7. The raw material delivery device of claim 1, wherein the raw material delivery device is disposed in a vertical configuration that is substantially parallel to the system vertical direction.

8. The raw material delivery device of claim 7, wherein the one or more steps are arranged in a staggered step configuration.

9. The raw material delivery device of claim 7, wherein the one or more steps are arranged in a spiral configuration and further comprising a rotary actuator that rotates the one or more steps about an axis and stops or slows movement to move the raw material from the inlet to the outlet.

10. The raw material delivery device of claim 1, wherein:
each one of the one or more steps comprises:
a base comprising a base aperture, and
an apex comprising an apex aperture; and
the base has a base diameter that is greater than an apex diameter of the apex and greater than a diameter of the base aperture.

11. An additive manufacturing system, comprising:
a work surface; and
a raw material delivery device disposed adjacent to the work surface, the raw material delivery device comprising:
a hollow body comprising a first end and a second end, the second end disposed above the first end in a system vertical direction,
an inlet disposed at the first end of the hollow body,
an outlet disposed at the second end of the hollow body,
a stepped passageway disposed within the hollow body between the inlet and the outlet; and
a first rotary actuator coupled to the first end of the hollow body and a second rotary actuator coupled to the second end of the hollow body, the first and second rotary actuators configured to synchronously rotate the first end and the second end to shake the hollow body such that one or more portions of raw material entering the hollow body at the inlet moves via the one or more steps toward the outlet.

12. The additive manufacturing system of claim 11, further comprising a raw material supply source, wherein the inlet is coupled to the raw material supply source such that the raw material supply source supplies the raw material to the raw material delivery device via the inlet.

13. The additive manufacturing system of claim 11, further comprising a recovery chute coupled between the work surface and the inlet of the raw material delivery device such that material deposited in the recovery chute from the work surface flows into the inlet of the raw material delivery device.

14. The additive manufacturing system of claim 11, wherein the outlet of the raw material delivery device is positioned adjacent to a portion of the work surface such that raw material exiting the outlet is deposited on the work surface; and
further comprising a powder distributor disposed over a portion of the work surface, the powder distributor arranged to spread the raw material deposited on the work surface from the outlet.

15. The additive manufacturing system of claim 11, wherein the one or more steps of the stepped passageway comprise a sieve that allows particles of the raw material having a predetermined size to exit the hollow body prior to reaching the outlet and the additive manufacturing system further comprises a waste receptacle, wherein the outlet is coupled to the waste receptacle such that raw material exiting the outlet is deposited within the waste receptacle.

16. The additive manufacturing system of claim 11, further comprising:
a supply assembly disposed between the outlet and the work surface; and
a sieve disposed between the outlet and the supply assembly or within the supply assembly.

17. A method of supplying raw material to a work surface of an additive manufacturing system, the method comprising:

supplying the raw material to an inlet of a raw material delivery device, the inlet disposed at a first end of a hollow body; and actuating a first rotary actuator coupled to the first end of the hollow body; actuating a second rotary actuator coupled to a second end of the hollow body such that the first and second rotary actuators synchronously rotate the first end and the second end to shake the hollow body and move raw material up a stepped passageway disposed within the hollow body from the inlet to an outlet disposed at the second end of the hollow body that is located above the first end of the hollow body in a system vertical direction.

18. The method of claim 17, further comprising repeating the supplying and actuating to move additional raw material up the stepped passageway from the inlet to the outlet.

* * * * *